(12) United States Patent
Kaneko et al.

(10) Patent No.: US 7,428,914 B2
(45) Date of Patent: Sep. 30, 2008

(54) FLOW CONTROL VALVE

(75) Inventors: Kenichiro Kaneko, Aichi-ken (JP);
Hiroshi Nishi, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 590 days.

(21) Appl. No.: 11/122,093

(22) Filed: May 5, 2005

(65) Prior Publication Data

US 2005/0257839 A1   Nov. 24, 2005

(30) Foreign Application Priority Data

| May 19, 2004 | (JP) | ............................. 2004-149456 |
| Aug. 18, 2004 | (JP) | ............................. 2004-238168 |
| Aug. 31, 2004 | (JP) | ............................. 2004-251443 |
| Aug. 31, 2004 | (JP) | ............................. 2004-251448 |

(51) Int. Cl.
  F16K 15/02 (2006.01)
  F16K 11/04 (2006.01)
  B60K 15/035 (2006.01)

(52) U.S. Cl. .................. 137/512.1; 137/512.5; 123/516

(58) Field of Classification Search ............. 137/512.1, 137/512.3, 512.5, 587, 588; 123/516, 518
See application file for complete search history.

(56) References Cited

U.S. PATENT DOCUMENTS

| 2,061,830 | A | * | 11/1936 | Campbell | ................ 137/513.5 |
| 2,247,520 | A | * | 7/1941 | Paxton | ..................... 137/512.1 |
| 2,677,939 | A | * | 5/1954 | Clute | ........................ 137/512.1 |
| 5,209,210 | A | * | 5/1993 | Ikeda et al. | .................. 123/516 |
| 5,570,672 | A | * | 11/1996 | Kunimitsu et al. | ........... 123/516 |
| 5,657,734 | A | * | 8/1997 | Sawamoto et al. | ........... 123/516 |
| 5,809,976 | A | * | 9/1998 | Cook et al. | .................. 123/516 |
| 6,851,458 | B2 | * | 2/2005 | Nakajima et al. | ............ 123/516 |
| 2003/0037838 | A1 | * | 2/2003 | Nakajima et al. | .............. 141/65 |
| 2003/0094203 | A1 | * | 5/2003 | D'Agostino et al. | ...... 137/512.1 |

FOREIGN PATENT DOCUMENTS

JP   A-2003-028010   1/2003

\* cited by examiner

*Primary Examiner*—John Rivell
(74) *Attorney, Agent, or Firm*—Posz Law Group, PLC

(57) ABSTRACT

A flow control valve includes a housing, a valve element, a valve-element urger, a first valve, and a second valve. The first valve closes the communication between inlet and outlet openings of the housing gradually when the valve-element urger moves the valve element away from the inlet opening. The second valve opens the communication between the inlet and outlet openings when the valve-element urger moves the valve element away from the inlet opening. The first valve is opened, and the second valve is closed when a differential pressure between a pressure of the fluid on an inlet-opening side and a pressure of the fluid on an outlet-opening side is a predetermined value or less. The second valve opens the communication between the inlet and outlet openings instantaneously when the differential pressure is more than a predetermined value.

15 Claims, 15 Drawing Sheets

FLOW CONTROL VALVE

BACKGROUND OF THE INVENTION

1. Field of the Invention

The present invention relates to a flow control valve used in parts, for which carrying out flow control is required, such as breather circuits for fuel tanks.

2. Description of the Related Art

In the vicinity of automobile fuel tanks, a vaporized-fuel circulating system, a so-called evaporator circuit, is disposed. The evaporator circuit leads vaporized fuels from fuel tanks to external canisters. The vaporized fuels are then adsorbed to activated carbon, and are stored temporarily therein. Thus, the evaporator circuit inhibits the pressure increment within fuel tanks, and at the same time prevents the vaporized fuels from being emitted into the outside air. The canisters are connected with engines, and engines exert an inlet negative pressure to release the adsorbed vaporized fuels from activated carbon to remix them into an air-fuel mixture. Accordingly, the adsorbed vaporized fuels are reused as fuels.

However, when a fuel sucks in fresh air through a fuel supply opening in a large volume in supplying fuel to an automotive fuel tank, fuel vaporizes facilitatively in the fuel tank. Accordingly, the volume of gases flowing to the canister increases. Consequently, the adsorption amount of gases to the canister has increased. Thus, it is needed to enlarge the canister. However, an enlarged canister causes a problem in view of designing for balancing the size and the installation space. Hence, the fuel tank is provided with a breather tube which communicates the gaseous phase in the fuel tank with the outside air. The breather tube is connected with an inlet pipe adjacent to a fuel supply opening of the inlet pipe at one of the opposite ends. Moreover, a breather nipple, which is fixed so as to communicate with the gaseous phase in the fuel tank, is fitted into the other opposite end of the breather tube. Therefore, the vaporized fuel present within the fuel tank in supplying fuel passes the breather tube through the breather nipple, and circulates again to the fuel tank by way of the inlet pipe. Thus, the fuel is inhibited from sucking in fresh air. In addition, it is possible to reduce the adsorption amount of vaporized fuel to the canister, because the fuel is inhibited from vaporizing.

Note that an orifice for controlling a breather gas volume is usually formed in the breather nipple so as not to increase the breather gas volume, which circulates from the breather tube to the inlet pipe, more than an air volume, which is sucked in at the fuel supply opening. Hereinafter, the circuit of gas circulating from the fuel tank, the breather nipple, the breather tube, the inlet pipe, and again to the fuel tank in this order will be referred to as a breather circuit.

Here, the fuel-supply rate in supplying fuel to fuel tanks can be divided into two types, a low rate represented by 15 L/min. and a fast rate represented by 38 L/min., depending on the specification and usage of fuel supply guns. Moreover, it is required to increase the breather gas volume circulating in the breather circuit in fast-rate fuel supply, because fuels suck in air more in the first-rate fuel than in the low-rate fuel supply.

In order to increase the breather gas volume circulating the breather circuit in fast-rate fuel supply, it is effective to enlarge the opening of the orifice. However, when enlarging the opening of the orifice, the breather gas volume circulating the breather circuit has increased even in low-rate fuel supply. Accordingly, the breather gas volume circulating the breather circuit has surpassed the sucked-in air volume in a low-rate fuel-supply range. Consequently, vapor leakage might occur through the fuel supply opening.

On the contrary, when diminishing the opening of the orifice, it is possible to prohibit vapor leakage in low-rate fuel supply. However, the volume difference has increased between the sucked-in air volume and the breather gas volume in fast-rate fuel supply. Accordingly, sucked-in fresh air facilitates the vaporization of fuel in the fuel tank. Consequently, the adsorption amount of vaporized fuel to the canister has enlarged.

FIG. 6 shows a conceptual diagram for illustrating the above-described relationships. In actuality, fuel supply is carried out at two levels, low-rate fuel supply and fast-rate fuel supply, however, FIG. 6 shows that the fuel-supply rate increases or decreases continuously. As indicated with the line "A," the sucked-in air volume depends on the fuel-supply rate continuously. As indicated with the curve "B," in a minor-opening-diameter orifice simulating low-rate fuel supply, the breather gas volume increases parallel to the sucked-in air volume in low-rate fuel supply, but the volume difference has enlarged between the sucked-in air volume and the breather gas volume as the fuel-supply rate increases. Accordingly, the sucked-in fresh air facilitates the vaporization of fuel in the fuel tank. Consequently, the adsorption amount of vaporized fuel to canister has enlarged. On the other hand, as indicated with the curve "C," in a major-opening-diameter orifice simulating fast-rate fuel supply, the breather gas volume surpasses the sucked-in air volume in a low-rate fuel-supply range. As a result, vapor leakage occurs.

That is, it is difficult for conventional breather nipples provided with a single orifice to cope with the required increment/decrement of breather gas depending on the increment/decrement of fuel-supply rate.

Hence, Japanese Unexamined Patent Publication (KOKAI) No. 8-216,707 proposes an apparatus for prohibiting evaporating fuel gases from being emitted, apparatus which is provided with variable means for controlling the circulation volume of evaporating fuel gases. Moreover, Japanese Unexamined Patent Publication (KOKAI) No. 2003-28,010 proposes to dispose a connector equipped with a built-in valve in a breather circuit, valve which controls the circulation volume of evaporating fuel gases depending on a pressure.

In the techniques disclosed in the patent publications, however, a valve for opening/closing a fluid passage is simply disposed in a breather circuit. Therefore, it is difficult to adequately control the breather gas volume in both low-rate fuel supply and fast-rate fuel supply. The disadvantage will be hereinafter described with reference to FIG. 7.

The breather gas pressure is affected greatly by temperature as well. Accordingly, the breather gas pressure fluctuates in low-rate fuel supply and fast-rate fuel supply, respectively. Consequently, when the breather gas volume to be secured in low-rate fuel supply is designated at "α" in FIG. 6 and the breather gas volume to be secured in fast-rate fuel supply is designated at "β" in the drawing, the relationship between ideal breather gas pressure and breather gas volume appears to be a curve "D" in the drawing. The breather gas pressure varies in a width of from "a" to "b" in the drawing in low-rate fuel supply, and varies in a width of from "c" to "d" in the drawing in fast-rate fuel supply.

However, the conventional techniques only employ such a structure that a valve opens as the breather gas pressure increases to gradually enlarge the breather gas volume. Accordingly, when the valve is adjusted to open at the maximum breather gas pressure designated at "b," for example, which is assumed to be a pressure for not causing vapor leakage through the fuel supply opening in low-rate fuel supply, the relationship between the breather gas pressure and the breather gas volume appears to be a curve "E" in the drawing. Consequently, when the breather gas pressure fluctuates in a lower range in fast-rate fuel supply as designated at a point "X" in the drawing, the breather gas volume comes short so that the volume of gas, which flows to the canister, has enlarged.

On the other hand, when the valve is adjusted to open at the minimum breather gas pressure designated at "c," which is assumed to be a pressure for substantially securing a predetermined breather gas volume in fast-rate fuel supply, the relationship between the breather gas pressure and the breather gas volume appears to be a curve "F" in the drawing. Consequently, when the breather gas pressure fluctuates in a higher range in low-rate fuel supply as designated at a point "Y" in the drawing, the breather gas volume becomes excessive so that vapor leakage has occurred.

Moreover, in the conventional techniques, the variable means for controlling the circulation volume of evaporating fuel gases depending on their pressure is disposed midway in the breather circuit. Accordingly, the conventional techniques suffer from not only the problem of the increased number of component parts but also the problem of the installation space. In addition, the variable means further causes a ventilation resistance in the breather circuit. Consequently, there arises a problem that the control for the conventional apparatus or connector becomes so unstable that it is less likely to control the breather gas volume, compared with the case where the breather gas volume is controlled by the inner pressure of fuel tank itself.

Incidentally, it has been required for breather tubes to provide reduced installation space. Hence, a breather tube is usually disposed in the following manner: a breather tube is disposed along an inlet pipe as much as possible; is bent thereafter at the leading end substantially perpendicularly; and is connected with a branched pipe which protrudes from a peripheral wall of the inlet pipe. Moreover, the substantially-perpendicularly-bent part of the breather tube and the branched pipe of the inlet pipe can desirably have short lengths as much as possible, respectively. However, in the connector equipped with the built-in valve disclosed in Japanese Unexamined Patent Publication (KOKAI) No. 2003-28, 010, not only a gas flow passage is formed linearly, but also it is equipped with the built-in valve. Accordingly, the connector has a long overall length relatively. Consequently, when the connector equipped with the built-in valve disclosed in the patent publication is disposed in a breather circuit, a breather tube has produced an enlarged installation space if the connector is disposed so as to be connected with a branched pipe which protrudes from a peripheral wall of the inlet pipe. As a result, it is inevitable to dispose the leading end of the breather tube along the inlet pipe. In this instance, however, it is required to bend the branched pipe, which protrudes from a peripheral wall of the inlet pipe and which is connected with the connector, in a letter "L" shape to result in a drawback in view of manufacturing cost. In short, the connector equipped with the built-in valve disclosed in the patent publication suffers from the drawbacks of limited installation disposition and low degree of designing freedom.

Moreover, when assembling the connector equipped with the built-in valve disclosed in Japanese Unexamined Patent Publication (KOKAI) No. 2003-28,010, paired linear component parts are first prepared. Then, fine component parts, such as a valve and a spring, are accommodated in one of the paired linear component parts. Finally, it is required to connect the other one of the paired component parts with the one of the paired linear component parts, in which the fine component parts are accommodated, so as to house the one of the paired linear component parts therein. Thus, the connector disclosed in the patent publication comprises a large number of component parts in assembly, and accordingly has a problem of poor manufacturing operability.

SUMMARY OF THE INVENTION

The present invention has been developed in view of the aforementioned circumstances. It is therefore an object of the present invention to provide a flow control valve which can not only cope accurately with the required increment/decrement of breather gas volume depending on the increment/decrement of fuel-supply rate but also can offer a high degree of designing and installation freedom.

A flow control valve according to the present invention can solve the aforementioned problems, and comprises:

a housing having an inlet opening through which a fluid flows thereinto, and an outlet opening through which the fluid, flowed in through the inlet opening, flows out to the outside;

a valve element disposed movably in the housing;

means for urging the valve element in a direction approaching the inlet opening;

a first valve formed between the valve element and the housing, and closing the communication between the inlet opening and the outlet opening gradually as the valve element moves in a direction getting away from the inlet opening; and a second valve formed between the valve element and the housing, and opening the communication between the inlet opening and the outlet opening as the valve element moves in a direction getting away from the inlet opening;

the first valve being opened and the second valve being closed when a differential pressure between a pressure of the fluid on an inlet-opening side and a pressure of the fluid on an outlet-opening side is a predetermined value or less;

the second valve opening the communication between the inlet opening and the outlet opening instantaneously when the differential pressure is more than a predetermined value.

The present flow control valve can preferably be applied to flow control valves which are used in breather circuits for fuel tanks. In this instance, the present flow control valve can preferably be arranged so that the housing is fixed on a top of a fuel tank in an air-proof manner; the inlet opening communicates with a gaseous phase of the fuel tank; and the outlet opening communicates with a breather nipple. Alternatively, the present flow control valve can preferably be arranged so that the housing is fixed on a top of a fuel tank in an air-proof manner; the inlet opening communicates with a gaseous phase of the fuel tank; and the outlet opening communicates with an inlet pipe adjacent to a fuel supply opening of the inlet pipe. Moreover, if such is the case, the housing can desirably have a cylinder-shaped portion formed at a bottom thereof, and communicating with the inlet opening.

Moreover, the present flow control valve can preferably be arranged so that it further comprises:

an inlet-side member comprising:
  a substantially cylinder-shaped first connector;
  a substantially cylinder-shaped pipe extending coaxially from the first connector, and having a peripheral wall in which the outlet opening is disposed; and a cover engaging mechanically with and being integrated with the pipe, and closing the leading end of the pipe to make the housing;

the cover closing the leading end of the pipe in such a manner that the valve element and the urging means are accommodated in the pipe, thereby integrating the inlet-side member; and an outlet-side member comprising:

a receptacle having a peripheral wall, and accommodating the pipe of the inlet-side member therein; and a second connector opening in the peripheral wall of the receptacle, and having a central axis extending in a direction crossing a central axis of the receptacle;

the pipe of the inlet-side member being fitted into the receptacle so as to communicate the outlet opening, disposed in the pipe, with the second connector;

the inlet-side member being connected with the outlet-side member in an air-proof manner and being integrated therewith so as to cross a central axis of the first connector with the central axis of the second connector.

In this instance, the first connector can be connected with a breather tube in an air-proof manner; and the second connector can be connected with a branched pipe in an air-proof manner, the branched pipe protruding from a peripheral wall of an inlet pipe. Note that the inlet pipe can be a filler pipe. Moreover, the cover can preferably have a protrusion protruding toward the inlet opening; and the first valve can desirably be formed between the valve element and the protrusion of the cover.

Alternatively, the valve element can preferably be formed as a bottomed cylinder substantially, the bottomed cylinder opening at one of opposite ends; the housing can preferably have a protrusion protruding toward the inlet opening; and the first valve can preferably be formed between the valve element and the protrusion of the housing. In this instance, the valve element can desirably have a peripheral opening disposed in a peripheral wall, and can desirably be fitted around the protrusion of the housing; and the peripheral opening of the valve element and the protrusion can desirably form the first valve. Moreover, the valve element can preferably have a flange; and the second valve can preferably be formed between the housing and the flange of the valve element.

When the second valve is formed between the flange of the valve element and the housing, the present flow control valve can desirably further comprise means for inhibiting the valve element from inclining, the means disposed between the valve element and the housing. The means can preferably comprise an interference flange protruding radially outward from an outer periphery of the valve element. Alternatively, the means can preferably comprise an interference rib protruding radially inward from an inner periphery of the housing.

Moreover, the present flow control valve can preferably be arranged so that the housing has a seating surface on which the valve element seats when the first pressure of the fluid on an inlet-opening side is the first predetermined value or less; and at least one of the housing and the valve element has a contact which contacts with the other one of the housing and the valve element, thereby forming a space between the valve element and the seating surface of the housing.

In accordance with the present flow control valve, the fluid flows from the inlet opening to the outlet opening through the first valve when a first pressure of the fluid on an inlet-opening side is a first predetermined value or less, because the first valve is opened. When a first pressure of the fluid on an inlet-opening side is more than (i.e., surpasses) the first predetermined value, the valve element moves to close the first valve. In this instance, a differential pressure between a first pressure of the fluid on an inlet-opening side and a second pressure of the fluid on an outlet-opening side increases sharply within the housing. Accordingly, the valve element moves instantaneously in a direction getting away from the inlet opening, and thereby the second valve opens instantaneously. Consequently, the fluid within the housing flows out instantaneously through the outlet opening. Therefore, the present flow control valve is good in terms of the response. When the present flow control valve is applied to breather circuits for fuel tanks, it can cope with fast-rate fuel supply and low-rate fuel supply flexibly.

Moreover, when the present flow control valve is arranged so that the housing has a seating surface on which the valve element seats when the first pressure of the fluid on an inlet-opening side is the first predetermined value or less; and at least one of the housing and the valve element has a contact which contacts with the other one of the housing and the valve element, thereby forming a space between the valve element and the seating surface of the housing, the valve element can be inhibited from adhering to the seating surface. Thus, the operation reliability of the present flow control valve upgrades. In addition, it is possible as well to further flow out liquid fuels, which have flowed into the housing, through the outlet opening by way of the space.

When the present flow control valve is arranged so that the housing is fixed on a top of a fuel tank in an air-proof manner; the inlet opening communicates with a gaseous phase of the fuel tank; and the outlet opening communicates with an inlet pipe adjacent to a fuel supply opening of the inlet pipe, a cylinder-shaped portion, which communicates with the inlet opening, can be formed at a bottom of the housing. As a result, it is possible to inhibit vapor leakage after a fuel supply gun is turned off automatically upon fuel tanks being filled up. Moreover, the present flow control valve can be applied to various fuel tanks whose filled-up liquid-level positions differ by simply adjusting the length of the cylinder-shaped portion to different filled-up liquid-level positions.

In addition, the present flow control valve can be readily designed so that a central axis of the inlet opening and a central axis of the outlet opening cross with each other. Accordingly, it is possible to control an overall length of the present flow control valve in such a length alone as to allow the movement of the valve element. Consequently, the present flow control valve can be made extremely compact. Therefore, even when the present flow control valve is used at a connection between a breather tube and an inlet pipe, it is possible to dispose the breather tube as close as possible to the inlet pipe. Thus, the degree of freedom improves remarkably in designing breather circuits.

Specifically, when a central axis of the inlet opening and a central axis of the outlet opening are made to cross with each other, it is possible to shorten an overall length of the present flow control valve compared with that of the conventional linear connector equipped with a built-in valve. Accordingly, the present flow control valve can be made extremely compact. Consequently, even when the present flow control valve is used at a connection between a breather tube and an inlet pipe, it is possible to dispose the breather pipe as close as possible to the inlet pipe. Thus, the degree of freedom improves remarkably in designing breather circuits. Moreover, when the pipe, in which the valve and urging means are accommodated, is closed with the cover, it is possible to supply the inlet-side member as an integrated subassembly. Therefore, the assembly operability of the present flow control valve enhances.

Moreover, when the present flow control valve is arranged so that the pipe of the first connector has a seating surface on which the valve element seats when the first pressure of the fluid on an first-connector side is the first predetermined value or less; and at least one of the pipe and the valve element has a contact which contacts with the other one of the pipe and the valve element, thereby forming a space between the valve element and the seating surface of the pipe, the valve element can be inhibited from adhering to the seating surface. Thus, the operation reliability of the present flow control valve upgrades. In addition, it is possible as well to further flow out liquid fuels, which have flowed into the housing, through the outlet opening by way of the space.

The present flow control valve can desirably further comprise means for inhibiting the valve element from inclining, the means disposed between the valve element and the housing. The valve-element-inclination inhibitor means inhibits the valve element from inclining (or swinging) greatly. Accordingly, the valve element moves more stably. Consequently, the present flow control valve is furthermore upgraded in terms of the response to pressure differences.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for the purpose of illustration only and not intended to limit the scope of the appended claims.

The present flow control valve can be applied not only to flow control valves for circulation lines, represented by the above-described breather circuit, but also to flow control valves for non-circulation lines. Moreover, the present flow control valve can control any liquid, either liquids or gases.

How the present flow control valve operates will be hereinafter described when it is applied to a breather circuit for a fuel tank. When a first pressure of a fluid on an inlet-opening side is a first predetermined value or less, the fluid, which has flowed into the housing through the inlet opening, flows out through the outlet opening by way of the first valve. ON the other hand, the first pressure of the fluid on an inlet-opening side surpassed the first predetermined value, the valve element moves in a direction getting away from the inlet opening. As the valve element thus moves, not only an opening area of the first valve narrows down, but also a flow rate of the fluid, which passes through the first valve, increases. In this instance, when the valve element has a flange and the second valve is formed between the housing and the flange of the valve element, for example, the increased flow rate of the fluid decreases a pressure of the fluid above the flange within the housing. At this moment, a difference increases sharply between the pressure of the fluid above the flange within the housing and the first pressure of the fluid on the inlet-opening side temporarily.

In flow control valves for breather circuits, a pressure of fluids on outlet-opening sides is substantially equal to the atmospheric pressure. Accordingly, in the present flow control valve, when the difference between the first pressure of the fluid on an inlet-opening side and a second pressure of the fluid on an outlet-opening side is more than (i.e., surpasses) a second predetermined value in fast-rate fuel supply, the second valve opens up the communication between the inlet opening and the outlet opening instantaneously. Consequently, the fluid on an outlet-opening side flows out rapidly through the outlet opening by way of the second valve. Therefore, the present flow control valve can secure required breather gas volumes depending on fast-rate fuel supply or low-rate fuel supply, and can inhibit the adsorption to canisters from increasing. Thus, the present flow control valve can prevent canisters from upsizing.

Figure 7:
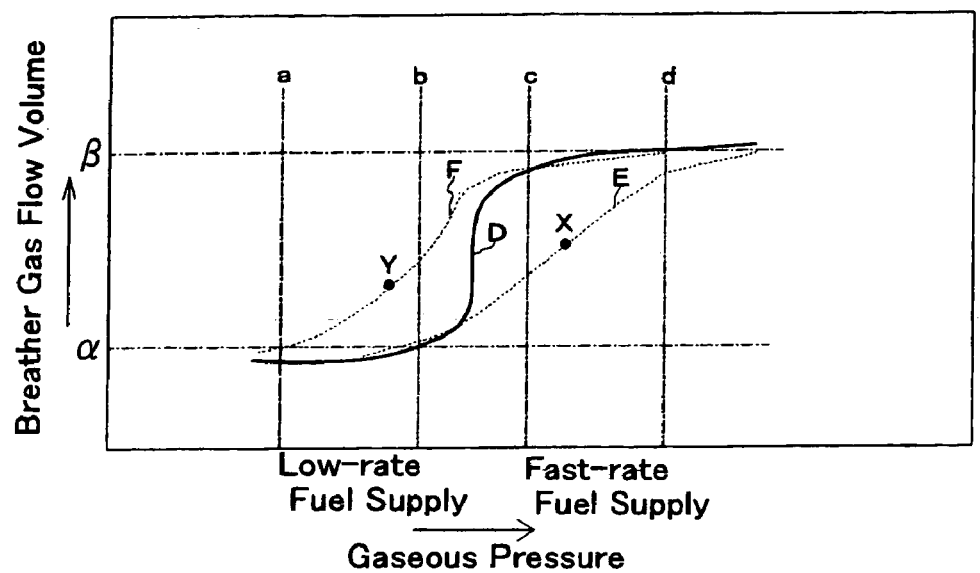
FIG. 7 is an explanatory diagram for illustrating relationships between breather-circuit gas pressures and breather gas volumes in a conventional flow control valve, and an ideal relationship therebetween.

When the breather gas pressure fluctuates greatly in low-rate fuel supply and fast-rate fuel supply as designated with the dotted curves "F" and "E" of FIG. 7, respectively, the interval between the breather gas pressure "b" and the breather gas pressure "c" narrows down. Accordingly in conventional flow control valves which increase the breather gas volume gradually as the breather gas pressure rises, the breather gas volume is likely to come short or excess. Consequently, the breather gas volume flowing to canisters is likely to increase, or vapor leakage through a fuel supply opening is likely to occur. However, even when the interval between the breather gas pressure "b" and the breather gas pressure "c" is narrow, the present flow control can instantaneously increase the breather gas volume even if the breather gas pressure falls in such a narrowed-down breather-gas-pressure interval. As a result, a breather gas volume/breather gas pressure curve exhibited by the present flow control valve can be approximated to the ideal curve "D" shown in FIG. 7. Therefore, the present flow out control valve is free from the above-described drawbacks.

The housing accommodates the valve element movably therein, and has the inlet opening and the outlet opening for a fluid. The housing can be fixed at various positions depending on the application purposes of the present flow control valve. For example, when the present flow control vale is applied to a breather nipple, the housing is fixed on a top of a fuel tank in an air-proof manner. In this instance, the inlet opening communicates with a gaseous phase of the fuel tank, and the outlet opening communicates with an inlet pipe adjacent to a fuel supply opening of the inlet pipe (e.g., a filler neck). The housing can protrude outside the fuel tank, or can be disposed inside the fuel tank. The fixing of the housing to the fuel tank can be done by mechanically fixing methods and adhering or welding fixing methods, and is not limited to these in particular.

Moreover, when the present flow control vale is applied to a breather nipple, the housing can preferably have a cylinder-shaped portion formed at a bottom thereof and extending into a fuel tank. Fuel tanks are provided with filled-up detection valves. When a liquid level of fuels reaches a predetermined position, the filled-up detection valves are actuated to increase the inner pressure of fuel tanks so that the increased inner pressure turns off fuel supply guns. Therefore, if the bottom end of the cylinder-shaped portion is positioned in the gaseous phase of fuel tanks upon detecting filled-up fuel tanks, vapor leakage through the fuel supply opening occurs even after turning off fuel supply guns automatically. Hence, when the bottom opening of the cylinder-shaped portion formed at a bottom thereof and extending into a fuel tank is positioned below the liquid-level position of the filled-up fuel tank, it is possible to prohibit-vapor leakage through the fuel supply opening from occurring.

The cylinder-shaped portion, which extends into the fuel tank, can be integrated with the housing. However, a cylinder-shaped portion, which is made independently of the housing, can preferably be integrated with the housing. In this way, it is possible to cope with a variety of fuel tanks whose filled-up liquid-level positions differ by simply adjusting the length of the cylinder-shaped portion. Thus, a plurality of fuel tanks can share most of the present flow control valve.

Moreover, the present fuel control valve can preferably arranged so that an inlet-side member comprises:
    a substantially cylinder-shaped first connector;
    a substantially cylinder-shaped pipe extending coaxially from the first connector, and having a peripheral wall in which the outlet opening is disposed; and
    a cover engaging mechanically with and being integrated with the pipe, and closing the a leading end of the pipe to make the housing;
    the cover closing the leading end of the pipe in such a manner that the valve element and the urging means are accommodated in the pipe, thereby integrating the inlet-side member; and
an outlet-side member comprises:
    a receptacle having a peripheral wall, and accommodating the pipe of the inlet-side member therein; and
    a second connector opening in the peripheral wall of the receptacle, and having a central axis extending in a direction crossing a central axis of the receptacle;
    the pipe of the inlet-side member being fitted into the receptacle so as to communicate the outlet opening, disposed in the pipe, with the second connector;
    the inlet-side member being connected with the outlet-side member in an air-proof manner and being integrated therewith so as to cross a central axis of the first connector with the central axis of the second connector.

When the present fuel control-valve is arranged as described above, it is possible to shorten an overall length of the present flow control valve compared with that of the conventional linear connector equipped with a built-in valve. Accordingly, the present flow control valve can be made extremely compact. Moreover, the inlet-side member can be supplied as an integrated subassembly, and can be connected with the outlet-side member, for instance, by welding. Consequently, the assembly operability of the present flow control valve enhances.

The cover and the pipe can be connected using adhesion or welding, or can be connected mechanically by claw engagement. Note that the inlet-side member and the outlet-side member can be connected in an air-proof manner mechanically by way of an O ring. However, the inlet-side member and the outlet-side member can preferably be connected by welding in an air-proof manner because welding can be done readily and the number of component parts can be minimum.

As described above, the present flow control valve comprises the valve element, the urging means, the first valve, and the second valve. The valve element is disposed movably in the housing. The urging means is for urging the valve element in a direction approaching the inlet opening. The first valve is formed between the valve element and the housing, and closes the communication between the inlet opening and the outlet opening gradually as the valve element moves in a direction getting away from the inlet opening. The second valve is formed between the valve element and the housing, and opens the communication between the inlet opening and the outlet opening as the valve element moves in a direction getting away from the inlet opening.

The present flow control Valve operates in the following manner. When a first pressure of a fluid on an inlet-opening side is smaller than an urging force of the urging means and the valve element is disposed adjacent to the inlet opening, the first valve is opened. Accordingly, the fluid on an inlet-opening side flows out through the outlet opening by way of the first valve. Moreover, as the valve element moves in a direction getting away from the inlet opening depending on the enlarging first pressure of the fluid on an inlet-opening side, an opening area of the first valve narrows down gradually. Consequently, the first pressure of the fluid on an inlet-opening side enlarges all the more. When a differential pressure between the first pressure of the fluid on an inlet-opening side and a second pressure of the fluid on an outlet-opening side surpassed a second predetermined value, the second valve opens up the communication between the inlet opening and the outlet opening instantaneously.

When the present flow control valve is applied to a breather nipple, for example, the urging force exerted by the urging means is designed to be such an urging force which does not let the valve element float upward by a gaseous pressure within a fuel tank in low-rate fuel supply. Thus, the present flow control valve is made to operate in the following manner. Even when the gaseous pressure within the fuel tank fluctuates in low-rate fuel supply, the first valve is kept from closing. Accordingly, it is possible to inhibit the adsorption to a canister from increasing. Moreover, when the valve element is designed to float upward by a large gaseous pressure within the fuel in fast-rate fuel supply, the opening area of the first valve narrows down gradually as the valve element moves in a direction getting away from the inlet opening. Consequently, when the differential pressure between the first pressure of the fluid on an inlet-opening side and the second pressure of the fluid on an outlet-opening side surpassed the second predetermined value, the second valve opens up the communication between the inlet opening and the outlet opening instantaneously. As a result, a breather gas volume/breather gas pressure curve exhibited by the present flow control valve can be approximated to the ideal curve "D" shown in FIG. 7. Therefore, the present flow out control valve can inhibit the occurrence of vapor leakage and enlarged adsorption to canisters.

As for the valve element, it is possible to use such movable elements that can float upward by a pressure of fluids. For example, as described in the following examples of the present flow control valve, it is possible to use basket-shaped elements or ball valves.

The valve element can preferably be formed as a bottomed cylinder substantially, the bottomed cylinder opening at one of opposite ends; the housing can preferably have a protrusion protruding toward the inlet opening; and the first valve can preferably be formed between the valve element and the protrusion of the housing. The protrusion of the housing can be formed as a cylinder shape. The bottomed cylinder of the valve element can be formed as shape conforming to an inner or outer peripheral shape of the protrusion. The protrusion and the bottomed cylinder overlap to gradually close the first valve. Moreover, this arrangement produces a further advantage that the protrusion guides the moving direction of the valve element.

For example, the valve element can preferably have a peripheral opening disposed in a peripheral wall, and be fitted around the protrusion of the cover; and the peripheral opening of the valve element and the protrusion can preferably form the first valve. In this manner, it is possible to inhibit the valve element from interfering with the protrusion when the valve element starts moving initially. Moreover, it is possible to move the valve element stably because the protrusion guides the valve element. In this instance, the first valve can be formed in the following manner. For instance, a through hole is formed as a peripheral opening in a peripheral wall of the protrusion or valve element. The through hole is closed gradually as the valve element moves.

The second valve is formed between the valve element and the housing, and opens the communication between the inlet opening and the outlet opening as the valve element moves in a direction getting away from the inlet opening. For example, the second valve can be formed between the valve element and the housing in the following manner. A flange, which separates the inlet opening from the outlet opening, is formed on the valve element. The flange closes the communication between the inlet opening and the outlet opening excepting the communication via the first valve while the first valve is opened. The valve moves, and thereby the flange cancels the separation between the inlet opening and the outlet opening to open the communication therebetween.

The second valve can be designed so as to close the communication between the inlet opening and the outlet opening when the first valve is being opened; and so as to open the communication at the moment that the valve element starts moving. However, the second valve can preferably be designed so as to open at the same time as the valve element moves by a predetermined distance to close the first valve. Moreover, when the flange makes the second valve, an extra advantage that the valve element is more likely to move because the flange increases a pressure receiving area.

When the present flow control valve is applied to a breather nipple for a breather circuit, and when it is designed as described above, upon the first valve being closed in fuel supply, a pressure within the housing is an atmospheric pressure on a downstream side with respect the valve element, but a pressure within the housing equals to an inner pressure of a fuel tank on an upstream side with respect the valve element. Thus, the pressure difference between the upstream side and the downstream sides enlarges so that the valve element moves more quickly. Therefore, even when the breather gas pressure in low-rate fuel supply and the breather gas pressure in fast-rate fuel supply fluctuate greatly to narrow down the interval between the breather gas pressure "b" and the breather gas pressure "c" as shown in FIG. 7, it is possible to keep vapor leakage from occurring and to inhibit the adsorption to a canister from increasing Accordingly, the present flow control valve can cope accurately with the required increment/decrement of breather gas volume depending on the increment/decrement of fuel-supply rate. Consequently, the present flow control valve can always secure a required breather gas volume.

The urging means can be the valve element's own weight. Alternatively, springs can be used as the urging means. The urging force of the urging means can be set up variously depending on the application purposes of the present flow control valve.

However, when flow control valves are disposed in breather circuits, liquid fuels might enter the housings. Moreover, in this instance, if housings have seating surfaces on which valve elements seat when a pressure of fluids is a predetermined value or less on an inlet-opening side, valve elements, which have been adhered onto the seating surfaces of housings by way of liquid fuels, might unstabilize the operations of flow control valves.

If such is the case, the present flow control valve can preferably be arranged so that at least one of the housing and the valve element has a contact which contacts with the other one of the housing and the valve element, thereby forming a space between the valve element and the seating surface of the housing. Thus, it is possible to let liquid fuels, which have flowed into the housing, flow out through the space. Accordingly, it is possible to keep the valve element from adhering onto the seating surface. Consequently, the operation reliability of the present flow control valve upgrades. As for the contact, it is possible to exemplify bosses, steps or shoulders, grooves and irregular surfaces.

Moreover, the present flow control valve is designed so that a minute space is provided between the valve element and the housing in order to let the valve element move smoothly. Accordingly, when a high pressure of fluids acts onto a part of the valve element locally, the valve element might swing to incline. Eventually, the valve element might interfere with a peripheral wall of the housing. If such is the case, the movement of the valve element might be unstabilized. Consequently, the present flow control valve might be unstabilized in terms of the response to pressure variations of fluids.

Hence, the present flow control valve can desirably further comprise means for inhibiting the valve element from inclining, the means disposed between the valve element and the housing closer and positioned closer to the inlet opening than the flange of the valve element. In the thus arranged present flow control valve, the means inhibits the valve element from swinging and eventually from inclining excessively. Accordingly, the movement of the valve element is furthermore stabilized. Consequently, the second valve can function more stably. As a result, the response of the present flow control valve upgrades more to pressure variations of fluids.

The means for inhibiting the valve element from inclining can be those which narrow down a space between an outer peripheral surface of the valve element and an inner peripheral surface of the housing. The valve-element-inclining inhibitor means can be integrated with the valve element, can be integrated with the housing, or can be disposed independently of the valve element and housing. For example, the valve-element-inclining-inhibitor means can preferably comprise an interference flange protruding radially outward from an outer periphery of the valve element. Alternatively, the valve-element-inclining inhibitor means can preferably comprise an interference rib protruding radially inward from an inner periphery of the housing. In these instances, it is possible not only to reduce the number of component parts but also to readily control the inclining angle of the valve element within a desirable angular range, because the valve element or the housing determines the sole position for disposing the valve-element-inclining inhibitor means explicitly.

The valve-element-inclining inhibitor means can desirably be disposed all around the outer periphery of the valve element. This arrangement enables the valve-element-inclining inhibitor means to readily inhibit the valve element from inclining in various direction.

The valve-element-inclining inhibitor means can desirably be disposed away from the flange of the valve element. The thus arranged valve-element-inclining inhibitor means can control the inclinable angle of the valve element as small as possible, and can function securely before the flange interferes with the housing. Accordingly, the valve element moves much more stably. Consequently, the response of the present flow control valve upgrades much more to pressure variations of fluids. Note that the valve-element-inclining inhibitor means can desirably be disposed so as to make the inclinable angle of the valve element fall within ±4 degrees with respect to a central axis of the valve element.

EXAMPLES

The present invention will be hereinafter described in more detail with reference to specific examples.

Example No. 1

Figure 1:
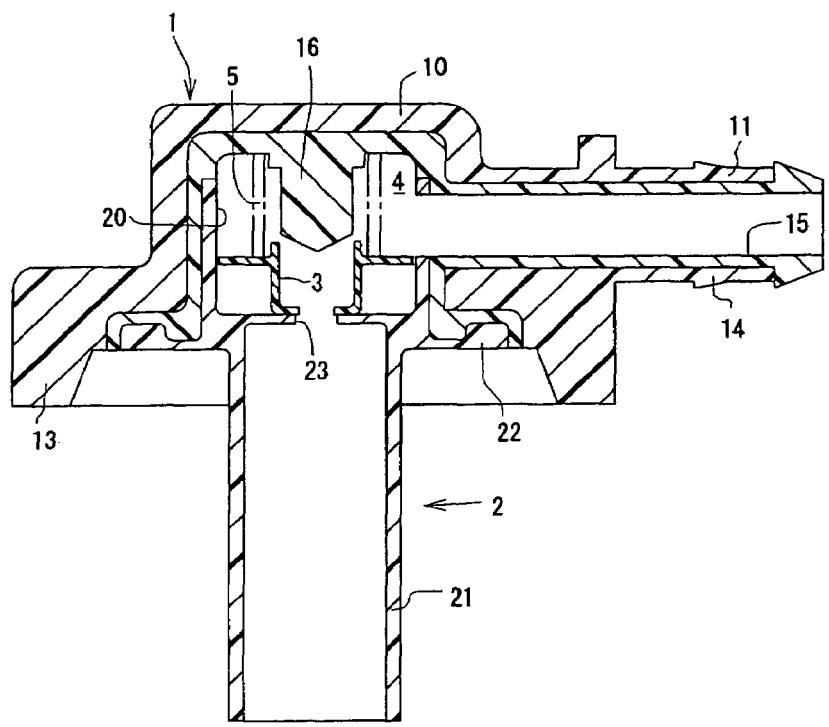
FIG. 1 is a cross-sectional view for illustrating a flow control valve according to Example No. 1 of the present invention.
Figure 2:
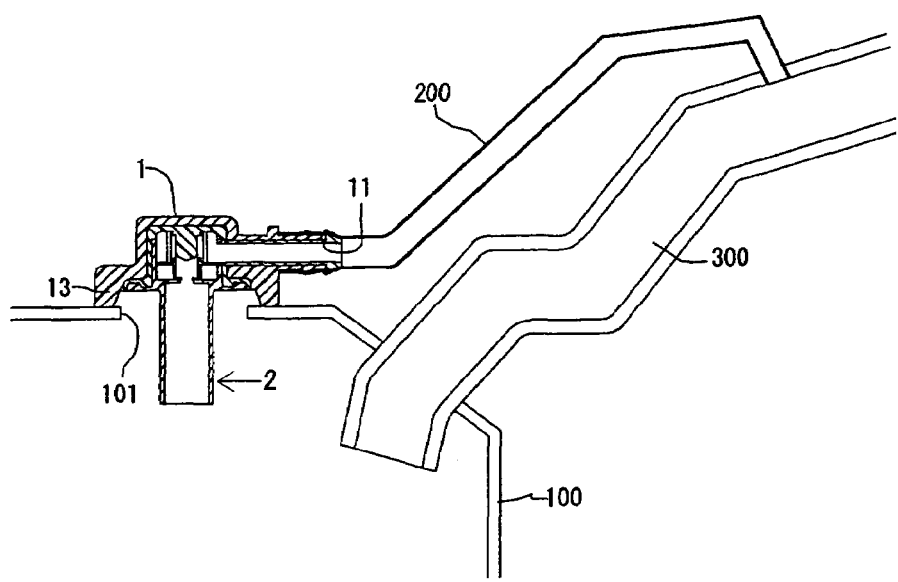
FIG. 2 is an explanatory diagram for illustrating a breather circuit which is equipped with the flow control valve according to Example No. 1.

FIG. 1 shows a cross-sectional view of a flow control valve according to Example No. 1 of the present invention. As illustrated in FIG. 2, the flow control valve is fixed to a top of a fuel tank 100 by welding. The flow control valve comprises a nipple 11 which is fitted into a breather tube 200. The breather tube 200 is connected with an inlet pipe 300 adjacent to a fuel supply opening of the inlet pipe 300.

As shown in the drawing, the flow control valve according to Example No. 1 of the present invention comprises a cover 1, a cylinder-shaped member 2, a valve element 3, and a spring 5. The cover 1 is manufactured by two-color molding. The cylinder-shaped member 2 is fixed to the cover 1 by welding.

The cover 1 comprises a bottomed receptacle 10, the nipple 11, and a ring-shaped disk-13. The receptacle 10 is formed as a cylinder, and has a peripheral wall. The nipple 11 protrudes radially outward from the peripheral wall of the receptacle 10. The disk 13 is formed around the opening periphery of the receptacle 10. The receptacle 10 and nipple 11 are formed of an outer layer 14, made of modified polyethylene, and an inner layer 15, made of polyamide. The disk 13 is formed of the same modified polyethylene as that of the outer layer 14. Moreover, a cylinder-shaped convex 16 is disposed about the center in the inner upper base of the receptacle 10 so as to protrude downward in an axial direction of the cylinder-shaped member 2.

The cylinder-shaped member 2 comprises a first cylinder 20, a second cylinder 21, and a flange 22; and is formed of polyamide entirely. The first cylinder 20 is formed as a bottomed cylinder. The second cylinder 21 extends from the first cylinder 20 coaxially, and has a diameter smaller than that of the first cylinder 20. The flange 22 is disposed at the boundary between the first cylinder 20 and the second cylinder 21, and protrudes radially outward. Moreover, the first cylinder 20 engages with the receptacle 10 of the cover 1, and the flange 22 is welded to the inner layer 15 of the receptacle 10. Accordingly, the cylinder-shaped member 2 is integrated with the cover 1. Consequently, a housing 4 is formed between the first cylinder 20 and the receptacle 10. In addition, a gas inlet hole 23 penetrates through the bottom of the first cylinder 20 of the cylinder-shaped member 2. Thus, the housing 4 communicates with a gaseous phase within the fuel tank 100 by way of the second cylinder 21 and gas inlet hole 23. Note that the housing 4, the convex 16 protruding from the receptacle 10, the gas inlet hole 23 and the second cylinder 21 are positioned coaxially.

Figure 3:
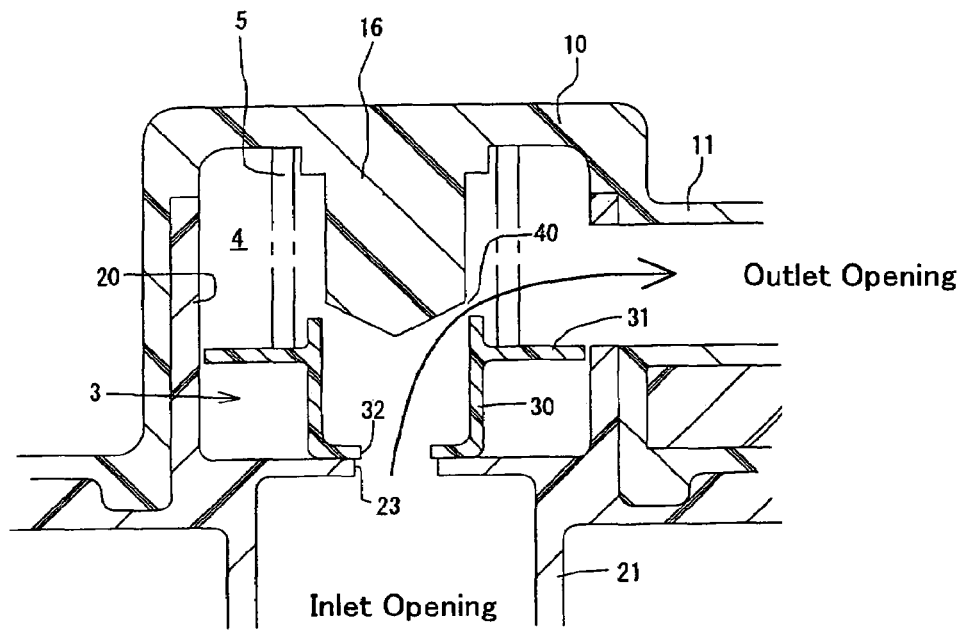
FIG. 3 is an explanatory diagram for illustrating an operation of the flow control valve according to Example No. 1.
Figure 4:
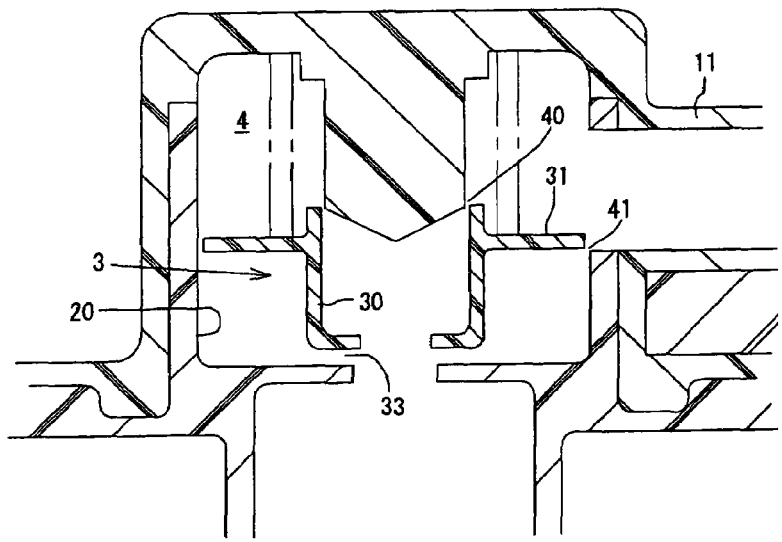
FIG. 4 is an explanatory diagram for illustrating another operation of the flow control valve according to Example No. 1.
Figure 5:
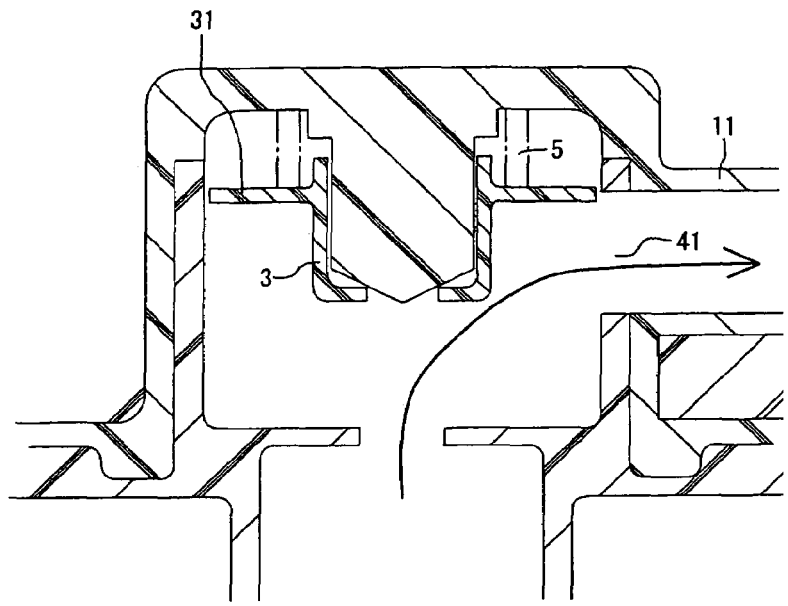
FIG. 5 is an explanatory diagram for illustrating still another operation of the flow control valve according to Example No. 1.
Figure 6:
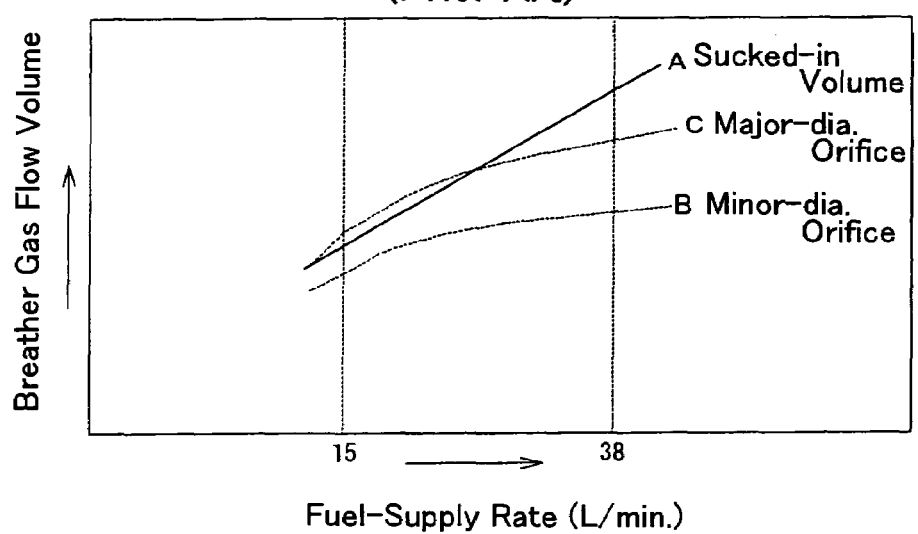
FIG. 6 is an explanatory diagram for illustrating relationships between fuel-supply rates and breather gas volumes in a flow-volume control for a conventional breather circuit.

As illustrated enlargedly in FIGS. 3 through 5, the valve element 3 comprises a cylinder 30, and a flange 31; and is formed of polyacetal resin. The cylinder 30 is formed as a bottomed cylinder shape. The flange 31 protrudes radially outward from an outer peripheral surface of the cylinder 30. At the center in the bottom of the cylinder 30, there is formed a through hole 32 whose diameter is smaller than that of the gas inlet hole 23. The outside diameter of the flange 31 is slightly smaller than the inside diameter of the housing 4. The inside diameter of the cylinder 30 is slightly larger than the outside diameter of the convex 16. Thus, the valve element 3 is disposed movably in the housing 4 in an axial direction.

Moreover, a spring 5 intervenes between the flange 31 and the inner upper base of the housing 4, and urges the valve element 3 toward the inner lower base of the housing 4 with a very weak force. In this instance, a space 40 is formed between the convex 16 and the opening end surface of the cylinder 30 as shown in FIG. 3. In addition, an outer peripheral surface of the flange 31 is disposed below the opening of the nipple 11, and disposed to face an inner peripheral surface of the housing 4 adjacently. Note that the convex 16, the cylinder 30, the through hole 32 and the gas inlet hole 23 are disposed coaxially.

In addition, note that, in the thus constructed flow control valve according to Example No. 1 of the present invention, the cover 1 is disposed to cover an opening 101 which is formed in an upper wall of the fuel tank 100 as shown in FIG. 2. The ring-shaped disk 13 of the cover 1 is fixed to a periphery of the opening 101. The second cylinder 21 of the cylinder-shaped member 2 is disposed in the gaseous phase of the fuel tank 100. Thus, the gas inlet hole 23 is equivalent to the claimed inlet opening. The opening of the housing 4, disposed closest to the nipple 111, is equivalent to the claimed outlet opening.

In low-rate fuel supply, the flow control valve according to Example No. 1 of the present invention lets gases within the fuel tank 100 pass the gas inlet hole 23, the through hole 32 and the space 40 in this order starting at the second cylinder 21; and lets the breather gas circulate the breather tube 200 and the inlet pipe 300 in this order starting at the nipple 11. In low-rate fuel supply, the pressure of gases within the fuel tank 100, which acts onto the valve element 3, acts exclusively onto the peripheral surface of the through hole 32, which is exposed in the gas inlet hole 23. However, the sum of the urging force of the spring 5 and the own weight of the valve element 3 is larger than the force which the gaseous pressure applies to the valve element 3. Thus, the valve element 3 does not move. Note that the opening area of the space 40 at this moment is equivalent to the summed cross-sectional area of flow-passage whose diameter is $\phi 3$ mm (i.e., about 7 mm$^2$).

In fast-rate fuel supply, the pressure of gases within the fuel tank 100 rises. The rising pressure acts onto the valve element 3 to let the valve element 3 start moving in the direction approaching the convex 16. Then, a space 33 arises between the lower base of the cylinder 30 and the upper base of the first cylinder 20. Accordingly, the pressure of gases within the fuel tank 100 acts onto the flange 31 to further push the valve element 3 upward. When the valve element 3 thus moves, the valve element 3 throttles the opening area of the space 40 as shown in FIG. 4. As a result, the pressure difference heightens sharply between the upper side (i.e., the fuel-opening side) above the flange 31 of the valve element 3 and the lower side (i.e., inside the tank 100) below the flange 31, because the upper side is subjected to an atmospheric pressure. Consequently, the valve element 3 ascends instantaneously as shown in FIG. 5, and the opening area of the space 41 enlarges instantaneously to open up the communication between the inlet opening and the outlet opening. Note that the opening area of the space 41 at this moment is equivalent to the maximum cross-sectional area of flow-passage whose diameter is $\phi 5$ mm (i.e., about 19 mm$^2$), more specifically to the cross-sectional area of the flow passage in the nipple 11. Moreover, in the flow control valve according to Example No. 1 of the present invention, the space 40 makes the claimed first valve, and the space 41 makes the claimed second valve.

In addition, when changing fast-rate fuel supply to low-rate fuel supply or turning off fuel supply, the urging force of the spring 5 moves the valve element 5 downward quickly to put it back into the state shown in FIG. 3.

Specifically, the flow control valve according to Example No. 1 of the present invention exhibits the relationship between the gaseous pressure and the breather gas flow volume as represented by the ideal curve "D" shown in FIG. 7. Accordingly, the flow control valve according to Example No. 1 is good in terms of the followability with respect to the increment/decrement of fuel-supply rate, and can increase or decrease the breather gas volume instantaneously. Consequently, the flow control valve according to Example No. 1 can inhibit unnecessary gases from flowing into canisters, and can inhibit vapor leakage from occurring. Moreover, compared with conventional flow control valves in which two members, an orifice and a valve, are used, it is easy to make adjustments. In addition, the flow control valve according to Example No. 1 has such a simplified structure as described above. Accordingly, the flow control valve according to Example No. 1 can be made less expensively. Moreover, the cylinder-shaped member 2 is made independently of the cover 1. Consequently, even when adjusting the length of the second cylinder 21 depending on the shape or capacity of the fuel tank 100, it is possible to cope with such adjustments by simply modifying the cylinder-shaped member 2 alone. Therefore, it is possible for a variety of fuel tanks to share the cover 1 and valve element 3.

Note that, depending on the breather-gas circulation volume, it is possible to operate the flow control valve according to Example No. 1 of the present invention in such a manner that the opening area of the space 40 (i.e., the claimed first valve) decreases gradually and simultaneously therewith the opening area of the space 41 (i.e., the claimed second valve) increases gradually.

Example No. 2

In above-described Example No. 1, the valve element 3 seats on the periphery of the gas inlet hole 23 in low-rate fuel supply. Accordingly, when a liquid fuel fills up the housing 4 to enter the boundary between the valve element 3 and the periphery of the gas inlet hole 23, the surface tension of liquid fuel might adhere the valve element 3 onto the periphery of the gas inlet hole 23 to unstabilize the operation of the valve element 3.

Figure 8:
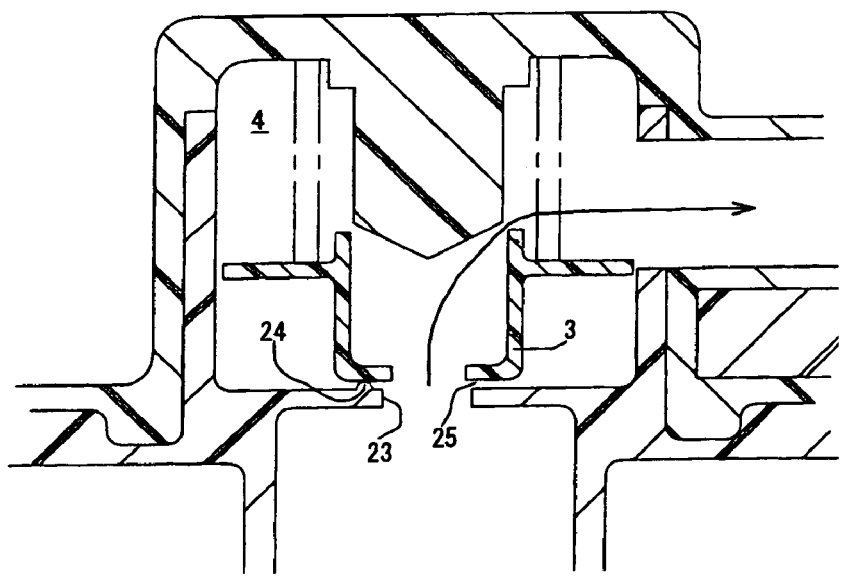
FIG. 8 is an enlarged cross-sectional view for illustrating a major part of a flow control valve according to Example No. 2 of the present invention.

Hence, in a flow control valve according to Example No. 2 of the present invention, a plurality of bosses 24, which are disposed at intervals in the peripheral direction of the gas inlet hole 23 and protrude upward, are formed on the periphery of the gas inlet hole 23 as shown in FIG. 8. In this way, the valve element 3 seats on the top of the bosses 24 so that the contact area diminishes. Therefore, the valve element 3 is inhibited from adhering onto the periphery of the gas inlet hole 23 so that the operational stability upgrades.

Note that the bosses 24 can be formed on the bottom surface of the valve element 3. Instead of the bosses 24, grooves or grained patterns, which are formed on either one of the periphery of the gas inlet hole 23 or the bottom surface of the valve element 3, operate and effect advantages likewise.

Example No. 3

Figure 9:
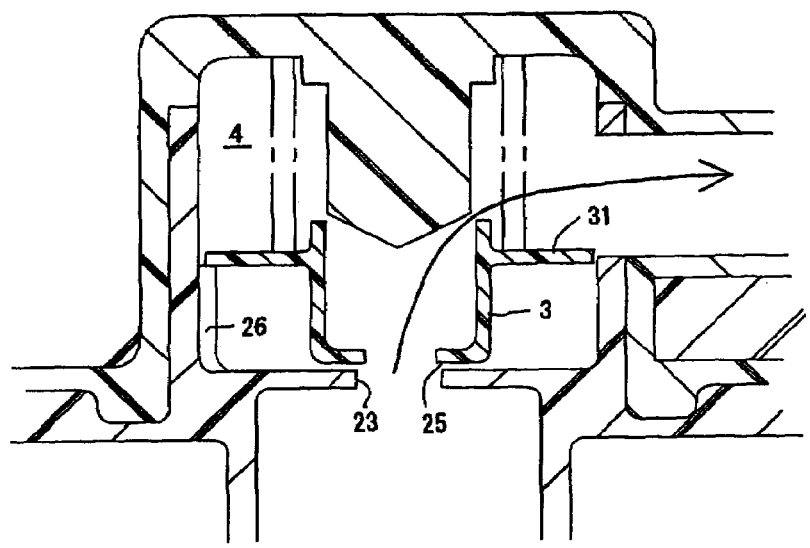
FIG. 9 is an enlarged cross-sectional view for illustrating a major part of a flow control valve according to Example No. 3 of the present invention.

Similarly to Example No. 2, a flow control valve according to Example No. 3 of the present invention further comprises means for inhibiting the valve element 3 from adhering onto the periphery of the periphery of the gas inlet hole 23. In the flow control valve according to Example No. 3, a plurality of ribs 26, which are disposed at intervals in the peripheral direction of the gas inlet hole 23, are formed on the inner peripheral surface of the housing 4 as shown in FIG. 9. Thus, it is possible to prohibit the valve element 3 from descending more than necessary after the flange 31 of the valve element 3 contacts with the ribs 26.

Example No. 4

Figure 10:
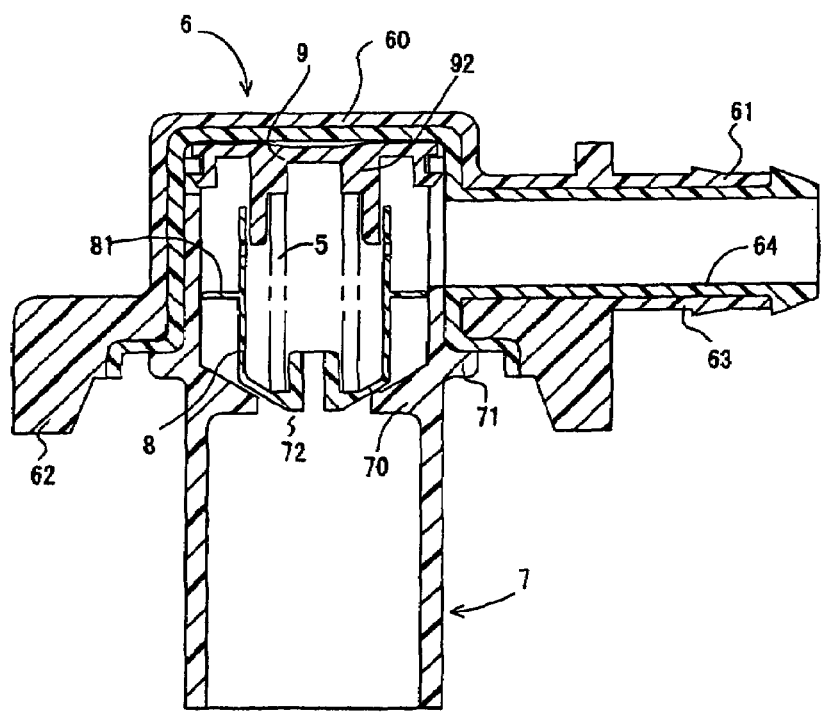
FIG. 10 is a cross-sectional view for illustrating a flow control valve according to Example No. 4 of the present invention.
Figure 11:
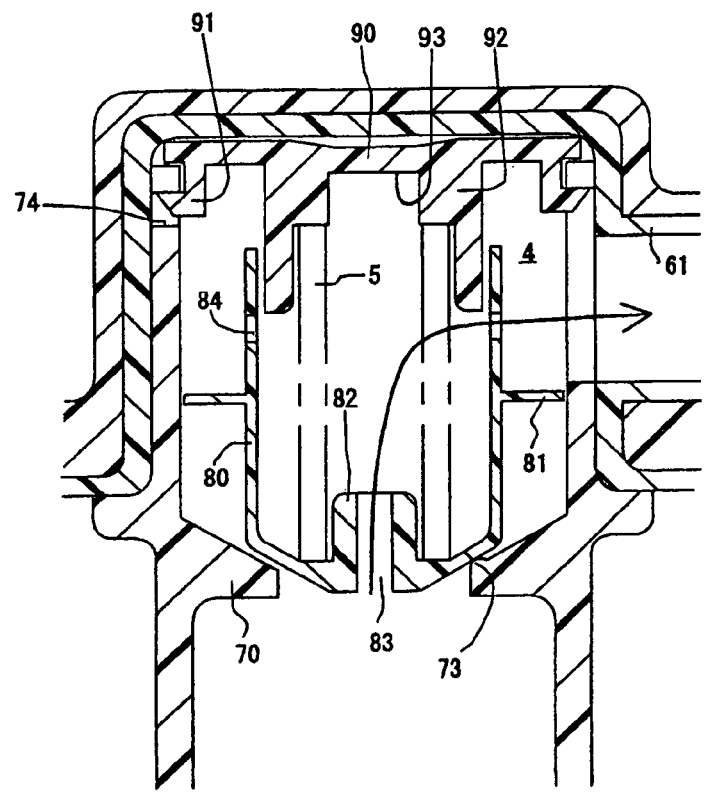
FIG. 11 is an explanatory diagram for illustrating an operation of the flow control valve according to Example No. 4.
Figure 12:
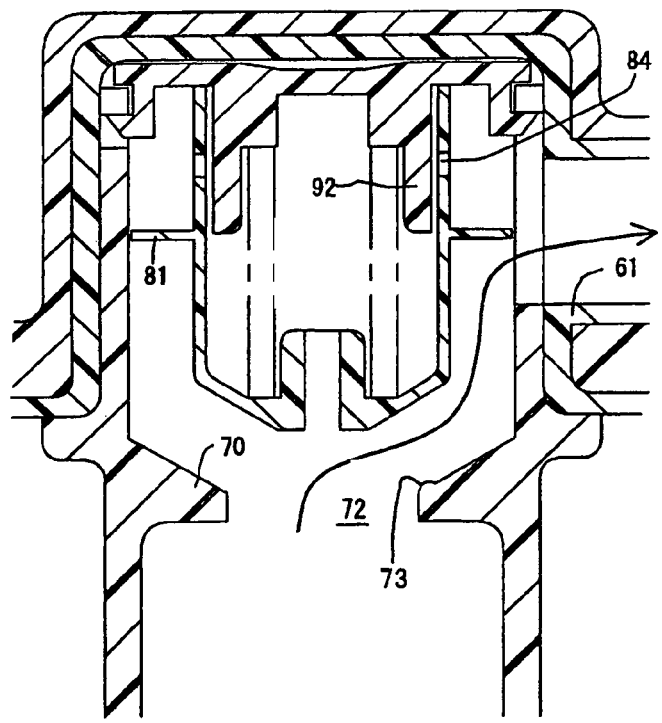
FIG. 12 is an explanatory diagram for illustrating another operation of the flow control valve according to Example No. 4.

FIGS. 10 through 12 illustrate a flow control valve according to Example No. 4 of the present invention. As shown in the drawings, except that the structures of the valve element 3, cylinder-shaped member 2 and convex 16 in Example No. 1 are modified, the flow control valve according to Example No. 4 comprises the same elements as those of Example No. 1.

Specifically, the flow control valve according to Example No. 4 of the present invention comprises a cover 6, a cylinder-shaped member 7, a valve element 8, a seating disk 9, and a spring 5. The cover 6 is manufactured by two-color molding. The cylinder-shaped member 7 is fixed to the cover 6 by welding.

The cover 6 comprises a bottomed receptacle 60, a nipple 61, and a ring-shaped disk 62. The receptacle 60 is formed as a cylinder, and has a peripheral wall. The nipple 61 protrudes radially outward from the peripheral wall of the receptacle 60. The disk 62 is formed around the opening periphery of the receptacle 60. The receptacle 60 and nipple 61 are formed of an outer layer 63, made of modified polyethylene, and an inner layer 64, made of polyamide. The disk 62 is formed of the same modified polyethylene as that of the outer layer 63.

The cylinder-shaped member 7 is made of polyamide; and comprises a diametrically-reduced portion 70, and a flange 71. The diametrically-reduced portion 70 is disposed at the intermediate part of the cylinder-shaped member 7. The flange 71 is formed around the outer periphery of the diametrically-reduced portion 70. Moreover, the top of the cylinder-shaped member 7 engages with the receptacle 60 of the cover 6, and the flange 71 is welded to the inner layer 64 of the receptacle 60. Accordingly, the cylinder-shaped member 7 is integrated with the cover 6. In addition, a gas inlet hole 72 penetrates through the diametrically-reduced portion 70 of the cylinder-shaped member 7. Moreover, as shown in FIGS. 11 and 12, a plurality of bosses 73 are formed on the diametrically-reduced portion 70. The bosses 73 are disposed at intervals in the peripheral direction of the diametrically-reduced portion 70, and protrude upward to the housing 4.

As shown in FIGS. 11 and 12, the valve element 8 comprises a cylinder 80, and a flange 81; and is formed of polyacetal resin. The cylinder 80 is formed as a bottomed cylinder shape. The flange 81 protrudes radially outward from an outer peripheral surface of the cylinder 80. In the bottom of the cylinder 80, there is formed a convex 82 which protrudes into the inner space of the cylinder 80. The convex 82 is provided with a ventilation hole 83 which is formed to penetrate through the convex 82 in an axial direction. The outside diameter of the flange 81 is slightly smaller than the inside diameter of the housing 4. Moreover, the outside diameter of the cylinder 80 is slightly larger than the inside diameter of the gas inlet hole 72. Thus, the valve element 8 is disposed movably in the housing 4 in the up/down direction while being prohibited from moving downward by the diametrically-reduced portion 70 of the cylinder-shaped member 7. In addition, a plurality of through holes 84 are formed in the leading-end peripheral wall of the cylinder 80. The through holes 84 penetrate the inside and outside of the cylinder 80 radially, and are disposed at intervals in the peripheral direction of the cylinder 80.

The seating disk 9 comprises a disk-shaped base 90, a plurality of engagement claws 91, and a protrusion 92; and is formed of polyacetal resin. The engagement claws 91 are disposed one after another at intervals on the periphery of the base 90. The protrusion 92 protrudes downward about the center of the base 90 in an axial direction, and has a recess 93 disposed about the center of the base 90. Note that the cylinder-shaped member 7 is provided with engagement holes 74 which are formed at the leading end. The engagement claws 91 of the seating disk 21 engage with the engagement holes 73 of the cylinder-shaped member 7. Accordingly, the seating disk 9 is fixed to the cylinder-shaped member 7. Note that the outside diameter of the protrusion 92 is smaller than the inside diameter of the cylinder 80 of the valve element 8. Consequently, the valve element 8 is disposed movably in the housing 4 in the up/down direction while being guided by the protrusion 92 of the seating disk 9.

Moreover, a spring 5 intervenes between the convex 82 and the protrusion 92, and urges the valve element 8 toward the gas inlet hole 72. In this instance, as illustrated in FIG. 11, a top surface of the flange 81 is disposed below the opening of the nipple 61, and a peripheral surface of the flange 81 faces an inner peripheral surface of the housing 4 adjacent to the opening of the nipple 61.

Similarly to Example No. 1, note that, in the thus constructed flow control valve according to Example No. 4 of the present invention, the cover 6 is disposed to cover an opening 101 which is formed in an upper wall of the fuel tank 100. The ring-shaped disk 62 of the cover 6 is fixed to a periphery of the opening 101 by welding. The lower end of the cylinder-shaped member 7 is disposed in the gaseous phase of the fuel tank 100. Thus, the gas inlet hole 72 is equivalent to the claimed inlet opening. The opening of the housing 4, disposed closest to the nipple 61, is equivalent to the claimed outlet opening.

In low-rate fuel supply, the flow control valve according to Example No. 4 of the present invention lets gases within the fuel tank 100 pass the gas inlet hole 72, the ventilation hole 83 and the through holes 84 in this order starting at the lower end of the cylinder-shaped member 7; and lets the breather gas circulate the breather tube 200 and the inlet pipe 300 in this order starting at the nipple 61. In low-rate fuel supply, even when the pressure of gases within the fuel tank 100 acts onto the valve element 8, the valve element 8 hardly moves because the sum of the urging force of the spring 5 and the own weight of the valve element 8 is larger than the force which the gaseous pressure applies to the valve element 8. In the state shown in FIG. 11, the gases, which flow through the through holes 84, are not inhibited from flowing, because the leading end of the protrusion 92 is disposed above the top ends of the through holes 84. Accordingly, the breather circuit functions stably. Moreover, even when liquid fuels exist within the housing 4, a space is formed between the valve element 8 and the diametrically-reduced portion 70 of the cylinder-shaped member 7, because the valve element 8 seats on the apexes of the bosses 73. Consequently, the valve element 8 operates highly reliably, because it is inhibited from adhering to the diametrically-reduced portion 70.

In fast-rate fuel supply, the pressure of gases within the fuel tank 100 rises. The rising pressure acts on to the valve element 8 to let the valve element 8 start moving in the direction approaching the protrusion 92. Then, the leading end of the convex 92 overlaps the through holes 84. Accordingly, the opening areas of the through holes 84 diminish gradually as the valve element 8 ascends. That is, the through holes 84 act as the claimed first valve. Thus, the first valve closes gradually. At the same time, the flange 81 ascends as well. However, the flange 81 is hardly exposed to the opening of the nipple 61 initially.

Moreover, the opening areas of the through holes 84 diminish gradually to exert increasing resistance to flowing gases as the pressure of gases within the fuel tank 100 rises. Eventually, the pressure difference heightens sharply between a gaseous pressure on the upper side (i.e., the fuel-opening side or atmospheric-pressure side) above the flange 81 of the valve element 8 and a gaseous pressure on the lower side (i.e., inside the tank 100) below the flange 81, because the protrusion 92 closes the through holes 84. As a result, the valve element 8 ascends instantaneously to communicate the opening of the nipple 61 with the gas inlet hole 72 as illustrated in FIG. 12. That is, the flange 81 functions as the claimed second valve. Thus, the second valve opens up fully.

Therefore, the flow control valve according to Example No. 4 of the present invention operates and effects advantages in the same manner as Example No. 1. Moreover, note that, even when the valve element 8 seats on the diametrically-reduced portion 70 of the cylinder-shaped member 7, the leading end of the seating disk 9's protrusion 92 is put in a state that it is fitted into the leading end of the valve element 8's cylinder 80. Accordingly, the valve element 8 moves smoothly while being guided by the protrusion 92. Thus, it is possible to securely prevent the interference of the valve element 8 with the protrusion 92 from obstructing the movement of the valve element 8. In addition, it is possible to make the entire configuration of the flow control valve according to Example No. 4 more compact, because it is possible to make the outside diameter of the spring 5 smaller than that of Example No. 1. Also note that, when assembling the flow control valve according to Example No. 4, it is possible to integrate the cylinder-shaped member 7, the valve element 8, the spring 5 and the seating disk 9 in advance. Consequently, it is possible to reduce the man-hour requirement for welding the cover 6 to the cylinder-shaped member 7, compared to that in Example No. 1.

Example No. 5

Figure 13:
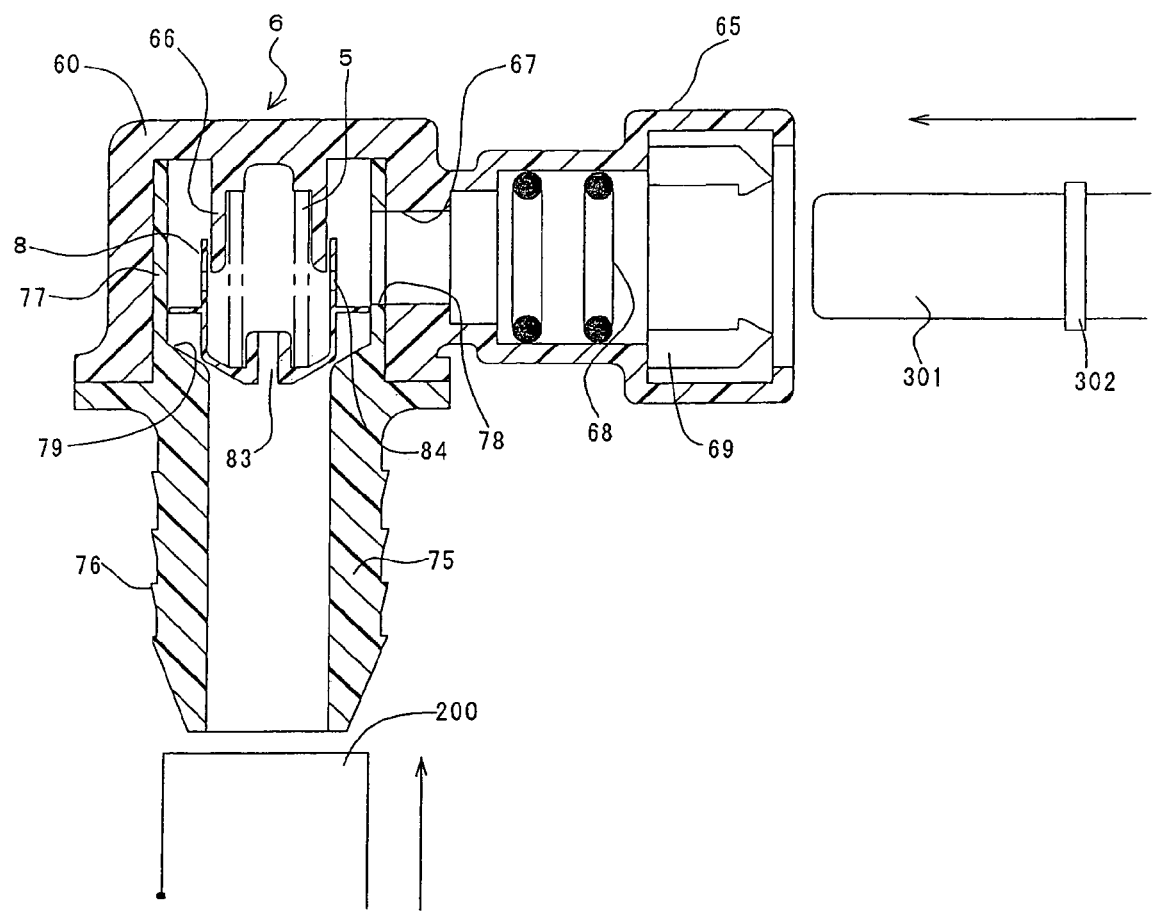
FIG. 13 is a cross-sectional view for illustrating a flow control valve according to Example No. 5 of the present invention.

FIG. 13 illustrates a flow control valve according to Example No. 5 of the present invention. The flow control valve according to Example No. 5 is used as a connector for connecting a breather tube of a breather circuit with an inlet pipe.

The flow control valve according to Example No. 5 of the present invention comprises a cover 6, a nipple 75 fixed to the cover 6 by welding, a valve element 8, and a spring 5.

The cover 6 comprises a bottomed receptacle 60, and a connector 65. The receptacle 60 is formed as a cylinder, and has a peripheral wall. The connector 65 protrudes radially outward from the peripheral wall of the receptacle 60. Moreover, a protrusion 66 protrudes downward from the inner base of the receptacle 60. Note that the protrusion 66 is formed as the same shape as that of the seating disk 9 in Example No. 4. That is, the protrusion 66 has a recess disposed about the center of the receptacle 60. In addition, in the peripheral wall of the receptacle 60, there is formed an outlet opening 67 which communicates with the connector 65.

The connector 65 is formed as a cylinder shape. In the connector 65, there are disposed two O-rings 68 at a predetermined interval. Moreover, in an outward opening of the connector 65, there are disposed a plurality of engagement claws 69 swingably. Note that the engagement claws 69 are made contractible/expandable diametrically.

On an outer peripheral surface of the nipple 75, there are formed a plurality of annular engagement ridges 76 which are formed as a fur-tree shape as a whole. On the opposite side of the nipple 75 with respect to the engagement ridges 76, there is formed a cylinder 77 whose inside diameter is made larger the inside diameter of the nipple 75 provided with the engagement ridges 76. The cylinder 77 is fitted into the receptacle 60 of the cover 6. Note that the cylinder 77 is provided with an opening 78 which communicates with the outlet opening 67. Moreover, at an intermediate part inside the nipple 75, there is formed a shoulder 79. In addition, at an outer periphery with respect to the intermediate part, the nipple 75 is welded to and integrated with the cover 6. Also note that the cylinder 77 functions as a guide for moving the valve element 8 stably.

The valve element 8 is the same as that of Example No. 4, and is disposed in the nipple 75 in the same manner as Example No. 4. The spring 5 is disposed in the protrusion 66 of the cover 6, and urges the valve element 8 in a direction seating it onto the shoulder 79.

The flow control valve according to Example No. 5 of the present invention is assembled in the following manner. The nipple 75 is fitted into and fixed to a breather tube 200. A branched pipe 301, which protrudes from a peripheral wall of an inlet pipe 300, is fitted into the connector 65. Note that an engagement flange 302 is formed on an outer peripheral surface of the branched pipe 301. The O-rings 68 contact elastically with the outer peripheral surface of the branched pipe 301. The engagement claws 69 engage with the engagement flange 302. Thus, the branched pipe 301 is fixed to the connector 65 in an air-proof manner.

In low-rate fuel supply, the flow control valve according to Example No. 5 of the present invention lets gases within the fuel tank 100 flow into the nipple 75 through the breather tube 200; lets them pass the ventilation hole 83 and the through holes 84; then lets them pass the opening 78 and the outlet opening 67; and finally lets them flow into the inlet pipe 300. In low-rate fuel supply, even when the pressure of gases within the fuel tank 100 acts onto the valve element 8, the valve element 8 hardly moves because the sum of the urging force of the spring 5 and the own weight of the valve element 8 is larger than the force which the gaseous pressure applies to the valve element 8. In this instance, the gases, which flow through the through holes 84, are not inhibited from flowing, because the leading end of the protrusion 66 is disposed above the top ends of the through holes 84. Accordingly, the breather circuit functions stably. On the other hand, in fast-rate fuel supply, the valve element 8 operates in the same manner as described in Example No. 4. Consequently, in fast-rate fuel supply as well, the flow control valve according to Example No. 5 operates and effects advantages in the same manner as Example No. 4.

Moreover, in the flow control valve according to Example No. 5 of the present invention, the central axis of the inlet opening (i.e., the central axis of the nipple 75) and the central axis of the outlet opening (i.e., the central axis of the outlet opening 67) cross with each other perpendicularly. Accordingly, it is possible to dispose the flow control valve according to Example No. 5 at the connection between the breather tube 200 and the inlet pipe 300 as a connector. Moreover, it is possible to make the summed dimension of the connector 65's length and the cover 6's diameter shorter than the overall length of the conventional connector disclosed in Japanese Unexamined Patent Publication (KOKAI) No. 2003-28,010. Consequently, it is possible to make the distance between the breather tube 200 and the inlet pipe 300 shorter. In addition, it is not necessary to bend the branched pipe 301 in a letter L shape. Thus, the flow control valve according to Example No.

5 offers remarkably upgraded degree of freedom in view of designing and installation space.

Note that, in the flow control valve according to Example No. 5 of the present invention, the cylinder 77 of the nipple 75 is fitted into the receptacle 60 of the cover 6. However, without forming the cylinder 77, the inner peripheral surface of the receptacle 60 can guide the valve element 8 directly. Moreover, instead of the nipple 75, the flow control valve according to Example No. 5 can be provided with a connector. Alternatively, instead of the connector 65, the flow control valve according to Example No. 5 can be provided with a nipple.

Example No. 6

The flow control valve according to Example No. 4 of the present invention, for example, is designed so that a minor space is provided between the valve element 8 and the housing 4 in order to let the valve element 8 move smoothly. Accordingly, when a part of the valve element 8 is subjected to a high fluid pressure locally, the valve element 8 might swing to eventually incline greatly as illustrated in FIG. 19.

Figure 19:
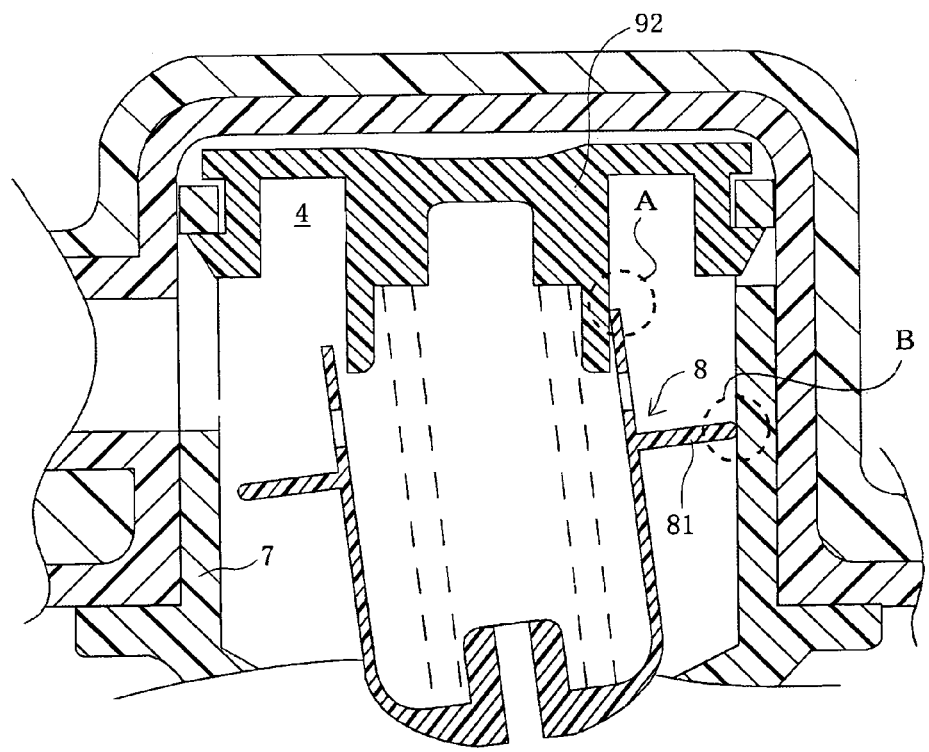
FIG. 19 is an explanatory diagram for illustrating a possible obstructive operation of the flow control valve according to Example No. 4.
Figure 20:
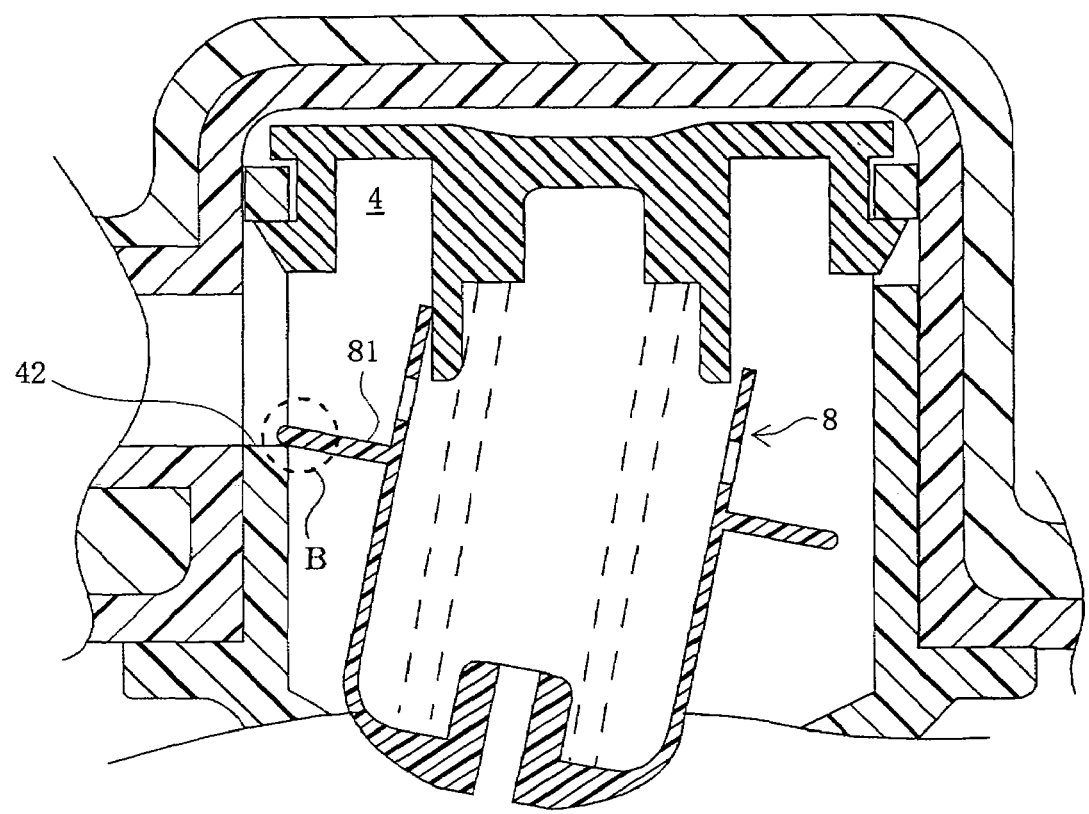
FIG. 20 is an explanatory diagram for illustrating another possible obstructive operation of the flow control valve according to Example No. 4.

The valve element 8 stops inclining in such a position that the axial opening end of the valve element 8 contacts with the protrusion 92 of the seating disk 9 as designated with the dotted circle "A" of FIG. 19; and the flange 81 of the valve element 8 contacts with the cylinder-shaped member 7 as designated with the dotted circle "B" of FIG. 19. Accordingly, depending on certain designs of the housing 4 and valve element 8, the valve element 8 might incline at a great angle with respect to the center line of the housing 4. If such is the case, the valve element 8 contacts with the inner periphery of the housing 4 so firmly that the valve element 8 hardly moves smoothly. Moreover, when the valve element 8 inclines greatly toward the outlet opening as illustrated in FIG. 20, the flange 81 of the valve element 8 might interfere with the outlet opening as designated with the dotted circle "B" of FIG. 20. If such is the case, the movement of the valve element 8 might be obstructed. In these cases, the valve element 8 might move unstably. Consequently, the valve element 8 might respond to the changes of gaseous pressures unstably.

A flow control valve according to Example No. 6 of the present invention solves the above-described possible drawbacks. Except that the flow control valve according to Example No. 6 comprises an interference flange, the claimed means for inhibiting the valve element 8 from inclining, the flow control valve according to Example No. 6 is the same as that according to Example No. 4. FIGS. 14 through 17 illustrate the cross sections of the flow control valve according to Example No. 6 schematically.

As shown in the drawings, the valve element 8 further comprises an interference flange 85 in addition to the flange 81 which is the same as that of Example No. 4. Note that the interference flange 85 is disposed below the flange 81 and as close as possible to the inlet opening. Moreover, the interference flange 85 is provided with a plurality of second through ventilation holes 86 disposed at predetermined intervals.

Figure 14:
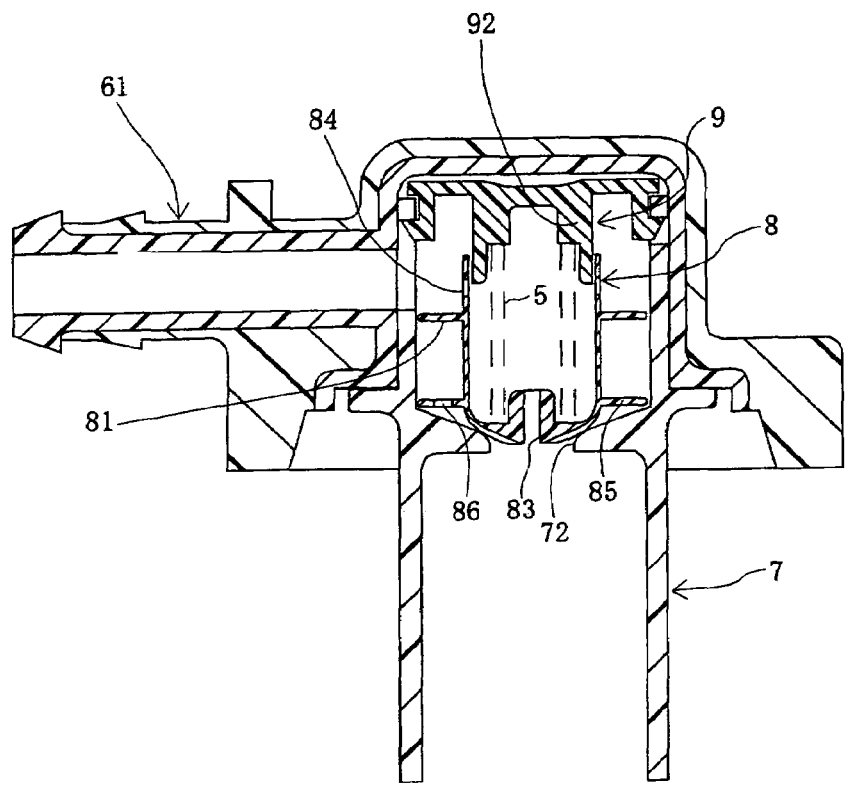
FIG. 14 is a cross-sectional view for illustrating a flow control valve according to Example No. 6 of the present invention.

As illustrated in FIG. 14, in low-rate fuel supply, the flow control valve according to Example No. 6 of the present invention lets gases within the fuel tank 100 pass the gas inlet hole 72, the first ventilation hole 83 and the through holes 84 mainly in this order starting at the lower end of the cylinder-shaped member 7; and lets the breather gas circulate the breather tube 200 and the inlet pipe 300 in this order starting at the nipple 61. In low-rate fuel supply, even when the pressure of gases within the fuel tank 100 acts onto the valve element 8, the valve element 8 hardly moves because the sum of the urging force of the spring 5 and the own weight of the valve element 8 is larger than the force which the gaseous pressure applies to the valve element 8. In the state shown in FIG. 14, the gases, which flow through the through hole 84, are not inhibited from flowing, because the leading end of the protrusion 92 is disposed above the top ends of the through holes 84. Accordingly, the breather circuit functions stably.

Figure 15:
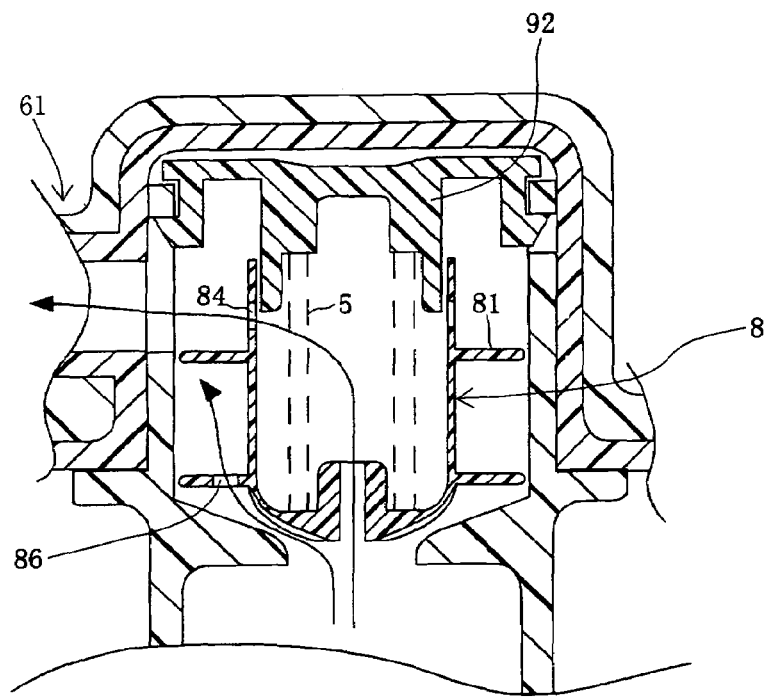
FIG. 15 is an explanatory diagram for illustrating an operation of the flow control valve according to Example No. 6.
Figure 16:
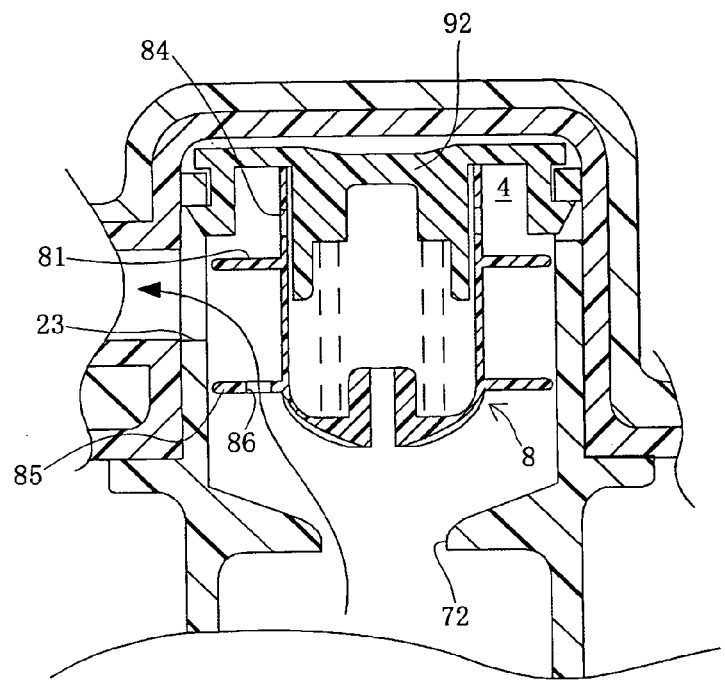
FIG. 16 is an explanatory diagram for illustrating another operation of the flow control valve according to Example No. 6.

In fast-rate fuel supply, the pressure of gases within the fuel tank 100 rises. The rising pressure acts onto the valve element 8 to let the valve element 8 start moving in the direction approaching the protrusion 92. Then, as illustrated in FIG. 15, the leading end of the protrusion 92 overlaps the through holes 84. Accordingly, the opening areas of the through holes 84 diminish gradually as the valve element 8 ascends. That is, the through holes 84 act as the claimed first valve. Thus, the first valve closes gradually. At the same time, the flange 81 ascends as well. However, the flange 81 is hardly-exposed to the opening of the nipple 61 initially.

Moreover, the opening areas of the through holes 84 diminish gradually to exert increasing resistance to flowing gases as the pressure of gases within the fuel tank 100 rises. Eventually, the pressure difference heightens sharply between a gaseous pressure on the upper side (i.e., the fuel-opening side or atmospheric-pressure side) above the flange 81 of the valve element 8 and a gaseous pressure on the lower side (i.e., inside the tank 100) below the flange 81, because the protrusion 92 closes the through holes 84. As a result, the valve element 8 ascends instantaneously to communicate the opening of the nipple 61 with the gas inlet hole 72 by way of the second through ventilation holes 86 as illustrated in FIG. 15. That is, the flange 81 functions as the claimed second valve. Thus, the second valve opens up fully.

Figure 17:
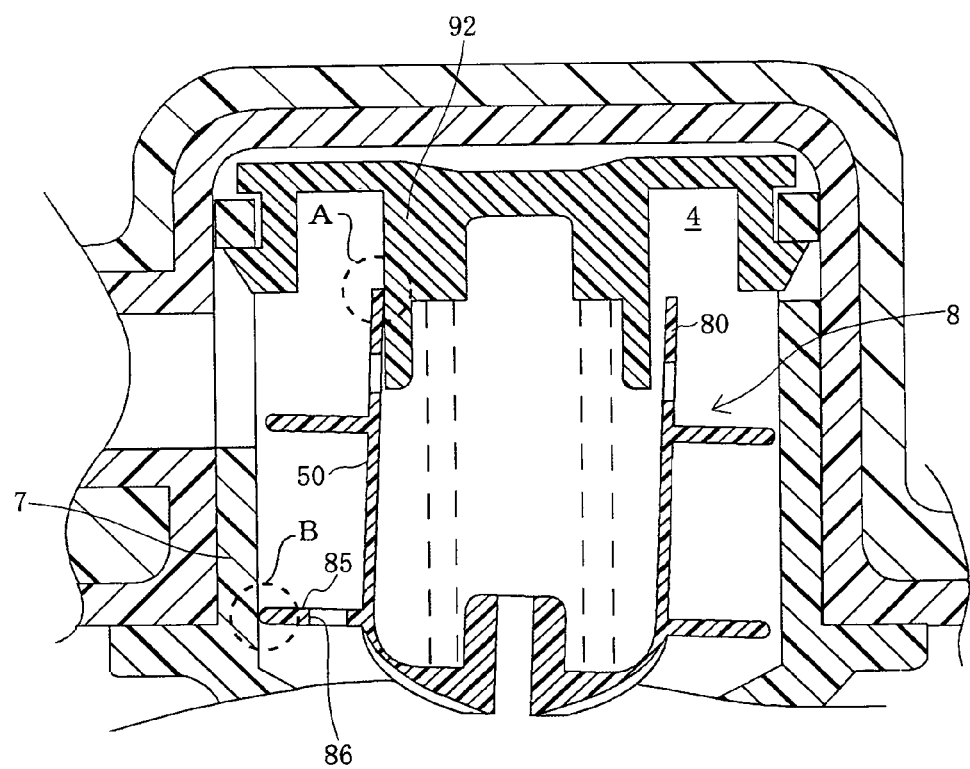
FIG. 17 is an explanatory diagram for illustrating still another operation of the flow control valve according to Example No. 6.

In the flow control valve according to Example No. 6 of the present invention, the valve element 8 further comprises the interference flange 85. The interference flange 85 is disposed below the flange 81 and as close as possible to the inlet opening. The interference flange 85 narrows down a space where the valve element 8 is disposed swingably within the housing 4. Accordingly, when a large gaseous pressure acts onto the valve element 8 locally to swing the valve element 8, the valve element 8 stops swinging in such a position as illustrated in FIG. 17 that the leading end of the valve element 8's cylinder 80 contacts with the protrusion 92 of the seating disk 9 as designated with the dotted circle "A" of FIG. 17; and the interference flange 85 of the valve element 8 contacts with the cylinder-shaped member 7 as designated with the dotted circle "B" of FIG. 17. Thus, the valve element 8 is inhibiting from inclining greatly so that the valve element 8 moves more stably. Consequently, the flow control valve according to Example No. 6 is further enhanced in terms of the response to the changes of gaseous pressures.

Note that, in the flow control valve according to Example No. 6 of the present invention, the interference flange 85 of the valve element 8 can preferably be disposed below the opening of the nipple 61 when the claimed second valve (i.e., the flange 81) opens up fully. In this way, the interference flange 85 hardly goes into the opening of the nipple 61. Accordingly, the interference flange 85 effects the advantageous effect, inhibiting the valve member 8 from inclining greatly, more securely.

Moreover, the dimension of the clearance between the interference flange 85 and the cylinder-shaped member 7 can preferably be the dimension of the clearance between the flange 81 and the cylinder-shaped member 7 or less. Consequently, it is possible to reliably reduce the inclinable range of the valve element 8.

Example No. 7

Figure 18:
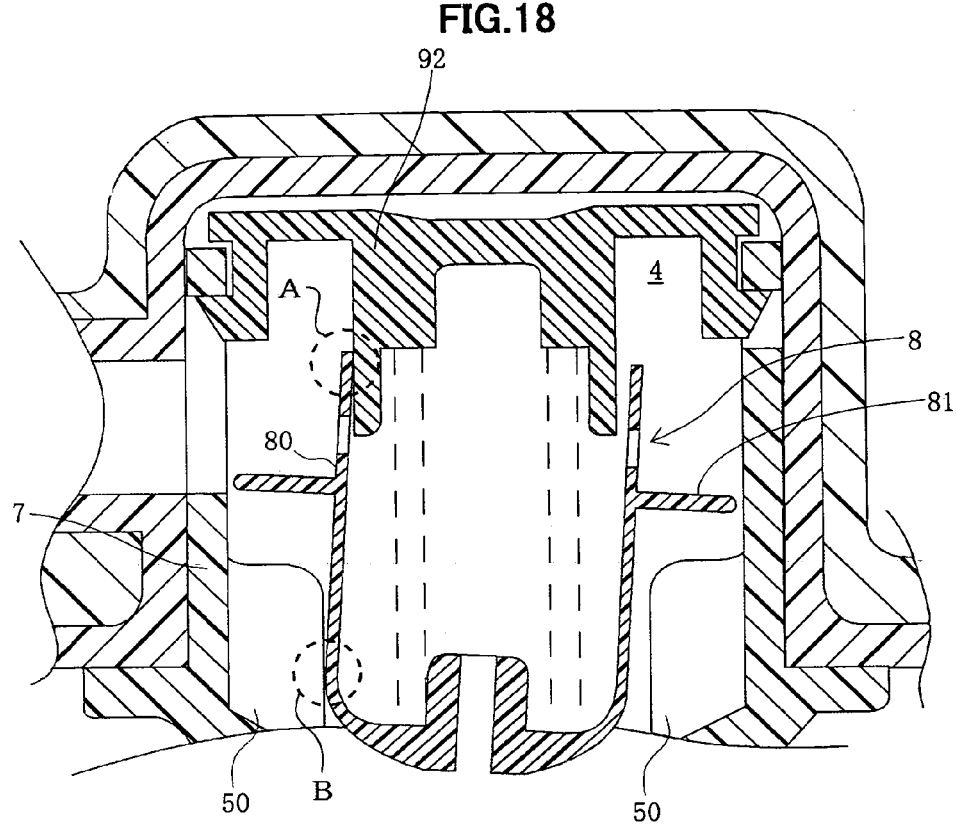
FIG. 18 is an explanatory diagram for illustrating an operation of a flow control valve according to Example No. 7 of the present invention.

Except that a flow control valve according to Example No. 7 of the present invention comprises another claimed means for inhibiting the valve element 8 from inclining, the flow control valve is the same as that according to Example No. 6. FIG. 18 illustrates a cross section of the flow control valve according to Example No. 7 schematically.

In the flow control valve according to Example No. 7 of the present invention, the claimed means for inhibiting the valve element 8 from inclining comprises a plurality of interference ribs 50. The interference ribs 50 protrude radially inward from the inner peripheral surface of the cylinder-shaped member 7, one of the component elements of the housing 4. Moreover, the interference ribs 50 are disposed closer to the inlet opening than the flange 81 of the valve element 8 is. In addition, the interference ribs 50 are disposed at predetermined intervals in the peripheral direction of the cylinder-shaped member 7, and are formed so as to protrude radially inward.

In the flow control valve according to Example No. 7 of the present invention, the cylinder-shaped member 7 comprises the interference ribs 50. The interference ribs 50 are disposed closer to the inlet opening than the flange 81 of the valve element 8 is. The interference ribs 50 narrow down a space between the outer peripheral surface of the valve element 8 and the inner peripheral surface of the housing 4. Therefore, similarly to the interference flange 85 in Example No. 6, the interference ribs 50 narrow down a space where the valve element 8 is disposed swingably within the housing 4. Accordingly, when a large gaseous pressure acts onto the valve element 8 locally to swing the valve element 8, the valve element 8 stops swinging in such a position as illustrated in FIG. 18 that the leading end of the valve element 8's cylinder 80 contacts with the protrusion 92 of the seating disk 9 as designated with the dotted circle "A" of FIG. 18; and the trailing end of the valve element 8 contacts with the interference ribs 50 of the cylinder-shaped member 7 as designated with the dotted circle "B" of FIG. 18. Thus, the valve element 8 is inhibiting from inclining greatly so that the valve element 8 moves more stably. Consequently, the flow control valve according to Example No. 7 is further enhanced in terms of the response to the changes of gaseous pressures.

Example No. 8

Figure 21:
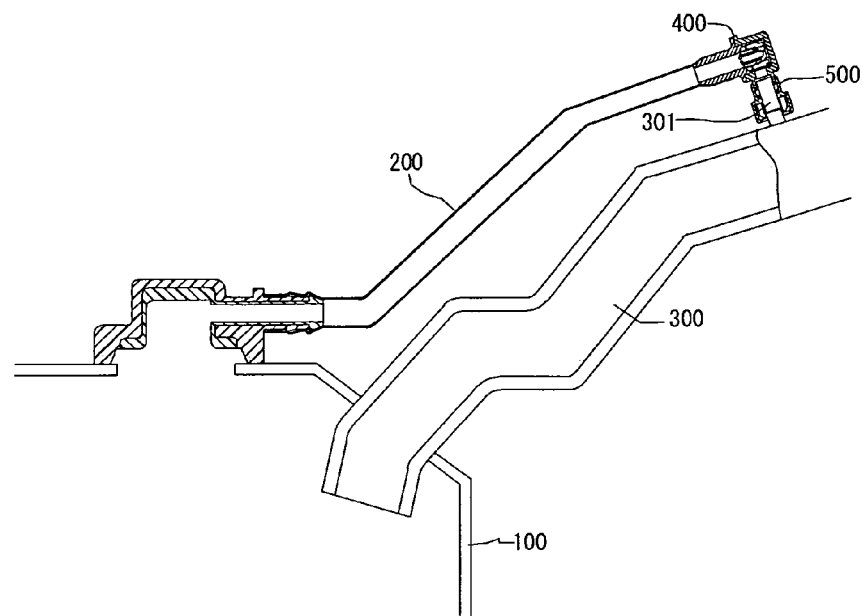
FIG. 21 is an explanatory diagram for illustrating a breather circuit which is equipped with a flow control valve according to Example No. 8 of the present invention.

As illustrated in FIG. 21, a flow control valve according to Example No. 8 of the present invention is applied to a connector which is disposed at the connection between the breather tube 200, extending from the fuel tank 100, and the inlet pipe 300.

Figure 22:
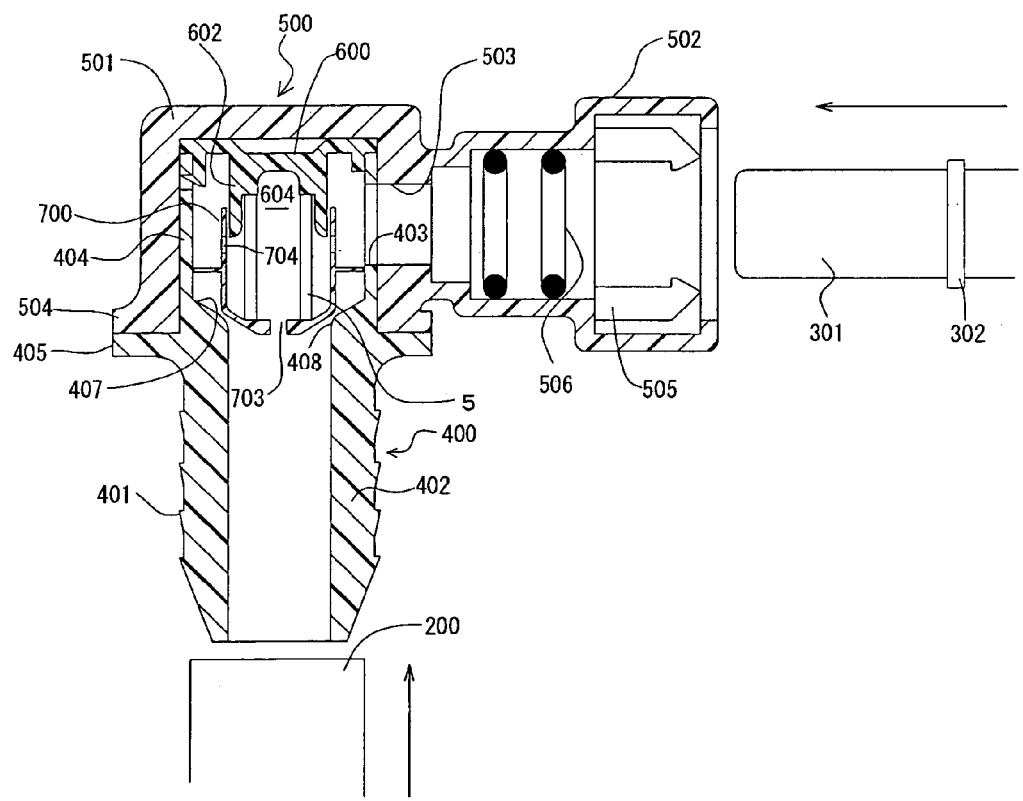
FIG. 22 is a cross-sectional view for illustrating the flow control valve according to Example No. 8.
Figure 23:
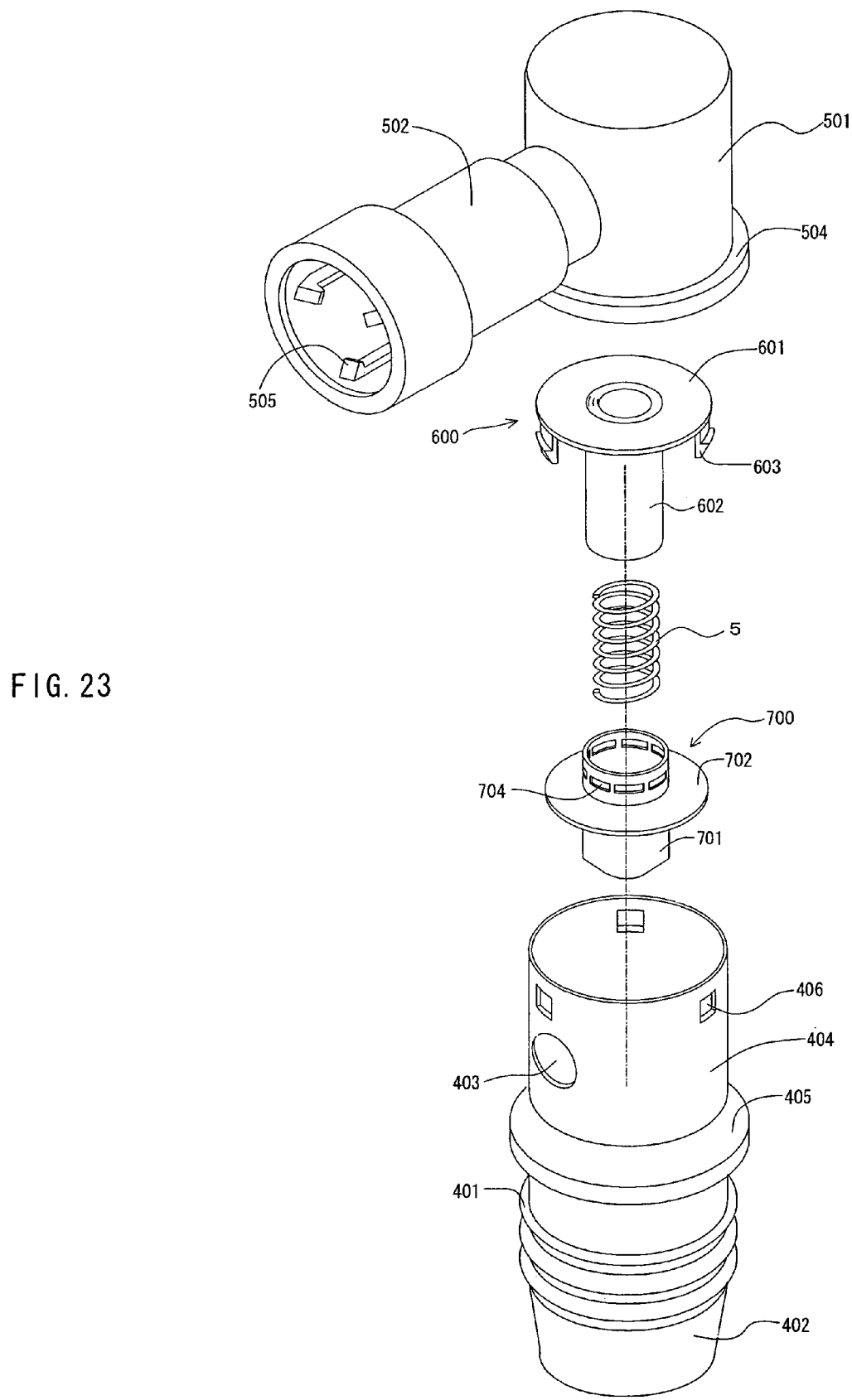
FIG. 23 is an exploded perspective view for illustrating an arrangement of component parts for the flow control valve according to Example No. 8.

FIG. 22 illustrates a cross section of the flow control valve according to Example No. 8 of the present invention. FIG. 23 illustrates an exploded perspective view for showing component elements of the flow control valve according to Example No. 8. As shown in the drawings, the flow control valve according to Example No. 8 comprises an inlet-side member 400, and an outlet-side member 500 connected to the inlet-side member 400 by welding. The inlet-side member 400 and outlet-side member 500 form a housing. The resultant housing accommodates a cap 600, a valve element 700 and a spring 5 therein.

The inlet-side member 400 comprises a substantially cylinder-shaped first connector 402, and a pipe 404. The first connector 402 has annular ridges 401 for sealing whose cross-section is formed as a triangle virtually on the outer periphery. The pipe 404 extends from the first connector 404 coaxially, and has an outlet opening 403 in the peripheral wall. At the outer peripheral boundary between the first connector 402 and the pipe 404, there is formed an inlet-side flange 405 for welding. In the leading-end peripheral wall of the pipe 404, there are formed a plurality of engagement holes 406 which are disposed at equal intervals in the peripheral direction. Moreover, on the inner peripheral boundary between the first connector 402 and the pipe 404, there is formed a truncated cone-shaped shoulder 407 whose tapered surface has inside diameters decreasing from large to small in the direction toward the leading end of the first connector 402. Thus, a gas outlet hole 408 is formed about the center of the shoulder 407.

The outlet-side member 500 comprises a receptacle 501, and a second connector 502. The receptacle 501 is formed as a bottomed cylinder shape which can accommodate the pipe 404 of the inlet-side member 400 therein. The second connector 502 protrudes from a peripheral wall of the receptacle 501, and has a central axis which extends in a direction crossing a central axis of the receptacle 501 perpendicularly. In the peripheral wall of the receptacle 501, there is formed an opening 503 of the second connector 502 which communicates with the inlet opening 403 of the pipe 404. Around an outer periphery of the leading-end opening of the receptacle 501, there is formed an outlet-side flange 504 for welding is formed. Moreover, inside the second connector 502, there are formed a plurality of hooks 505 at equal intervals in the peripheral direction. Note that the hooks 505 can elastically deform diametrically. In addition, on an inner side with respect to the hooks 505 of the second connector 502, the second connector 502 accommodates O-rings 506 therein.

Both inlet-side member 400 and outlet-side member 500 are formed of polyamide resin. The inlet-side member 400 and outlet-side member 500 are integrated in an air-proof manner by fitting the pipe 404 into the receptacle 501 and welding the inlet-side flange 405 to the outlet-side flange 503.

The cap 600 is formed of polyacetal; and comprises a flange-shaped head 601, and a shaft 602 protruding coaxially from the head 601 about the center of the head 601. On an outer periphery of the head 601, there are formed a plurality of engagement studs 603 are formed at equal intervals, as best shown in FIG. 23. The engagement studs 603 protrude parallel to an axial direction of the shaft 602, and engage with the engagement holes 406 of the pipe 404 of the inlet-side member 400. Moreover, the leading end of the shaft 602 is provided with a holder bore 604 which is formed for holding one of the opposite ends of the spring 5.

The valve element 700 is formed of polyacetal; and comprises a cylinder 701, and a flange 702. The cylinder 701 is formed as a bottomed cylinder shape. The flange 702 protrudes radially outward from an intermediate outer periphery of the cylinder 701. The bottom of the cylinder 701 is formed as a truncated cone shape whose outside diameters reduce from large to small toward the leading end, and is provided with a ventilation hole 703 which is formed about the center of the cylinder 701 to penetrate the bottom of the cylinder 701 axially. The flange 702 is formed to have an outside diameter which is slightly smaller than the inside diameter of the pipe 404 of the inlet-side member 400. Moreover, the cylinder 701 is formed to have an inside diameter which is larger than the outside diameter of the shaft 602 of the cap 600. In addition, in the leading-end peripheral wall of the cylinder 701, there are formed a plurality of through holes 704 at predetermined intervals in the peripheral direction. The through holes 704 penetrate the leading-end peripheral wall of the cylinder 701 radially to communicate the inside and outside of the cylinder 701.

The inlet-side member 400 is assembled in the following manner. First, the valve element 700 is accommodated inside the pipe 404, and the spring 5 is accommodated inside the cylinder 701 of the valve element 700. Then, the shaft 602 of the cap 600 is fitted into the cylinder 701, and thereby one of the opposite ends of the spring 5 is held in the holder bore 604 of the shaft 602. Finally, the engagement studs 603 of the cap 600 are engaged with the engagement holes 406 of the pipe 404 to fix the cap 600 to the pipe 404. Thus, the inlet-side member 400 is assembled in which the valve element 700 and spring 5 are accommodated. In the thus assembled inlet-side member 400, the spring 5 urges the valve element 700 so as to press the valve element 700 toward the shoulder 407 with a minor force. When the valve element 700 is subjected to a certain force overcoming the minor force, the valve element 700 can move along the shaft 602. Moreover, when the valve element 700 contacts with the shoulder 407, the through holes 704 hardly overlap the shaft 602. Accordingly, in this instance, the inside of the cylinder 701 communicates with the inside of the pipe 404 by way of the through holes 704.

The thus integrally-subassembled inlet-side member 400 is assembled with the outlet-side member 500, in which the O-rings 506 are accommodated in advance, in the following manner, thereby completing the manufacture of the flow control valve according to Example No. 8 of the present invention. First, the pipe 404 of the inlet-side member 400 is fitted into the receptacle 501 of the outlet-side member 500 so as to completely communicate the outlet-opening 403 of the pipe 400 and the opening 503 of the second connector 502 by disposing them coaxially with each other. Then, the inlet-side member 400 and outlet-side member 500 are integrated in an air-proof manner by welding the inlet-side flange 405 to the outlet-side flange 503. Thus, the number of component parts in welding has been reduced to only two, the subassembled inlet side member 400 and the outlet-side member 500. Therefore, the flow control valve according to Example No. 8 is good in terms of the assembly operability.

The flow control valve according to Example No. 8 of the present invention is assembled with a breather tube and an inlet pipe in the following manner. The first connector 402 is press-fitted into and fixed to a breather tube 200. A branched pipe 301, which protrudes from a peripheral wall of an inlet pipe 300, is fitted into the second connector 502. In this instance, the hooks 505 of the second connector 502 deform to expand diametrically and thereafter recover the original shape so that the hooks 505 engage with an engagement flange 302, which is formed on an outer peripheral surface of the branched pipe 301, to connect the second connector 502 with and fix it to the branched pipe 301. Note that the O-rings 506 seal the boundary between the outer peripheral surface of the branched pipe 301 and the inner peripheral surface of the second connector 502 in an air-proof manner.

Note that, in the flow control valve according to Example No. 8 of the present invention, the central axis of the first connector 402 and the central axis of the second connector 502 cross with each other perpendicularly. Accordingly, it is possible to dispose the breather tube 200 as close as possible to the inlet pipe 300. In addition, it is not necessary to bend the branched pipe 301 at all. Consequently, the flow control valve according to Example No. 5 offers remarkably upgraded degree of freedom in view of designing breather circuits.

Figure 24:
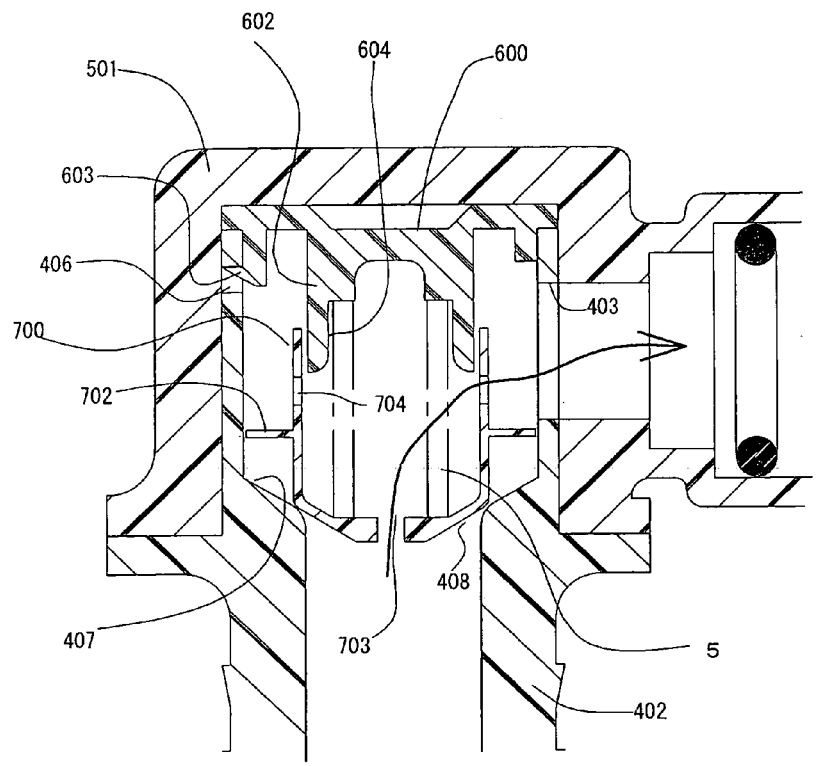
FIG. 24 is an explanatory diagram for illustrating an operation of the flow control valve according to Example No. 8.

In low-rate fuel supply, the flow control valve according to Example No. 8 of the present invention lets gases within the fuel tank 100 pass the gas inlet hole 408, the ventilation hole 703, the cylinder 701, the through holes 704, the outlet opening 403 and the second connector 502 in this order starting at the leading end of the first connector 402; and lets the breather gas circulate the breather tube 200, the inlet pipe 300 and the fuel tank 100 in this order. In low-rate fuel supply, when the pressure of gases within the fuel tank 100 acts onto the valve element 700, the valve element 700 does not move because the sum of the urging force of the spring 5 and the own weight of the valve element 700 is larger than the force which the gaseous pressure applies to the valve element 700. FIG. 24 illustrates this situation. As illustrated in the drawing, the gases, which flow through the through holes 704, are not inhibited from flowing, because the inside of the first connector 402 is communicated with the outlet opening 403 and second connector 502 by way of the ventilation hole 703 and through holes 704. Accordingly, the breather circuit functions stably.

In fast-rate fuel supply, the pressure of gases within the fuel tank 100 rises. The rising pressure acts onto the valve element 700 to let the valve element 700 start moving in the direction approaching the cap 600. Then, the leading end of the shaft 602 of the cap 600 overlaps the through holes 704. Consequently, the opening areas of the through holes 704 diminish gradually as the valve element 700 ascends. That is, the through holes 704 act as the claimed first valve. Thus, the first valve closes gradually. At the same time, the flange 702 of the valve element 700 ascends as well. However, the flange 702 is hardly exposed to the outlet opening 403 of the pipe 404 initially.

Figure 25:
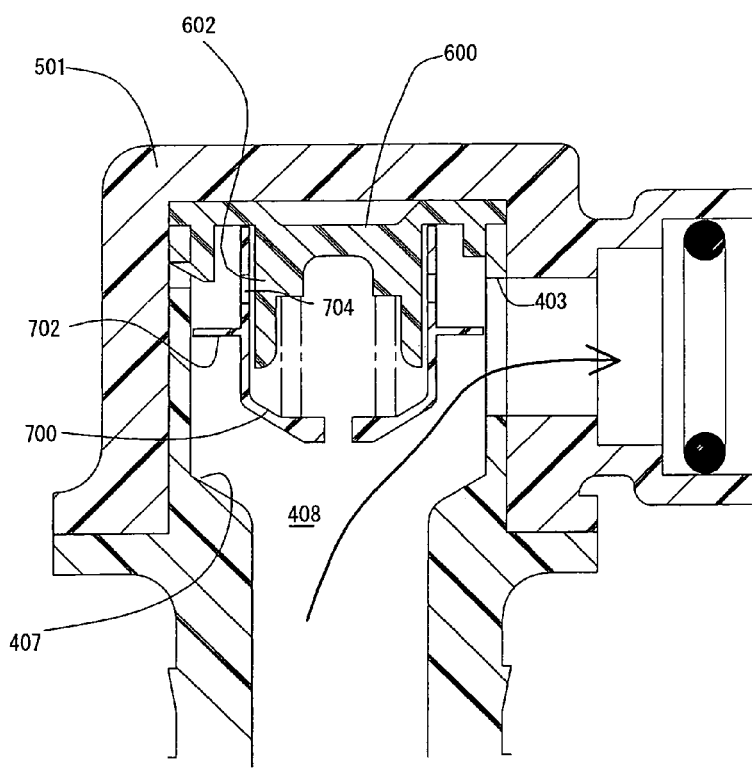
FIG. 25 is an explanatory diagram for illustrating another operation of the flow control valve according to Example No. 8.

Moreover, the opening areas of the through holes 704 diminish gradually as the pressure of gases within the fuel tank 100 rises, and the flow rate of gases increases. Accordingly, the pressure decreases on a side of the second connector 502. Eventually, the pressure difference heightens sharply between a gaseous pressure on the first connector 402's side (i.e., the breather tube 200's side or atmospheric-pressure side) below the flange 702 of the valve element 700 and a gaseous pressure on the second connector 502's side (i.e., the inlet pipe 300's side) above the flange 702, because the shaft 602 of the cap 600 closes the through holes 704 of the valve element 700. As a result, the valve element 700 ascends instantaneously to directly communicate the outlet opening 403 with the gas inlet hole 408 of the pipe 404, as illustrated in FIG. 25. That is, the flange 702 functions as the claimed second valve. Thus, the second valve opens up fully.

In addition, when fast-rate fuel supply is switched to low-rate fuel supply, or when fuel supply is stopped, the urging force of the spring 5 moves the valve element 700 downward quickly back to the state illustrated in FIG. 24.

Specifically, the flow control valve according to Example No. 8 of the present invention exhibits the relationship between the gaseous pressure and the breather gas flow volume as represented by the ideal curve "D" shown in FIG. 7. Accordingly, the flow control valve is good in terms of the followability with respect to the increment/decrement of fuel-supply rate, and can increase or decrease the breather gas volume instantaneously. Consequently, the flow control valve according to Example No. 8 can inhibit liquid fuels from blowing backward from fuel tanks, and can inhibit vapor leakage from occurring. Moreover, compared with conventional flow control valves, it is easy to make adjustments. In addition, the flow control valve according to Example No. 8 has such a simplified structure as described above. Accordingly, the flow control valve according to Example No. 8 can be made less expensively. Moreover, the flow control valve according to Example No. 8 enables breather tubes to be disposed along inlet pipes as close as possible to them. Consequently, the flow control valve according to Example No. 8 not only produces an advantageous effect in view of installation space, but also exhibits higher degree of freedom in view of designing and disposition. In addition, the inlet-side member 404 can be supplied as an integrated subassembly, and can be simply connected with the outlet-side member 500 by welding to complete the flow control valve according to Example No. 8. Therefore, the flow control valve according to Example No. 8 offers upgraded assembly operability.

Example No. 9

In above-described Example No. 8, the valve element 700 seats on the shoulder 407 of the pipe 404 when a fuel is not supplied, or in low-rate fuel supply. Accordingly, when a liquid fuel fills up the pipe 404 to enter the boundary between the valve element 700 and the shoulder 407, the surface tension of liquid fuel might adhere the valve element 700 onto the shoulder 407 to unstabilize the operation of the valve element 700.

Figure 26:
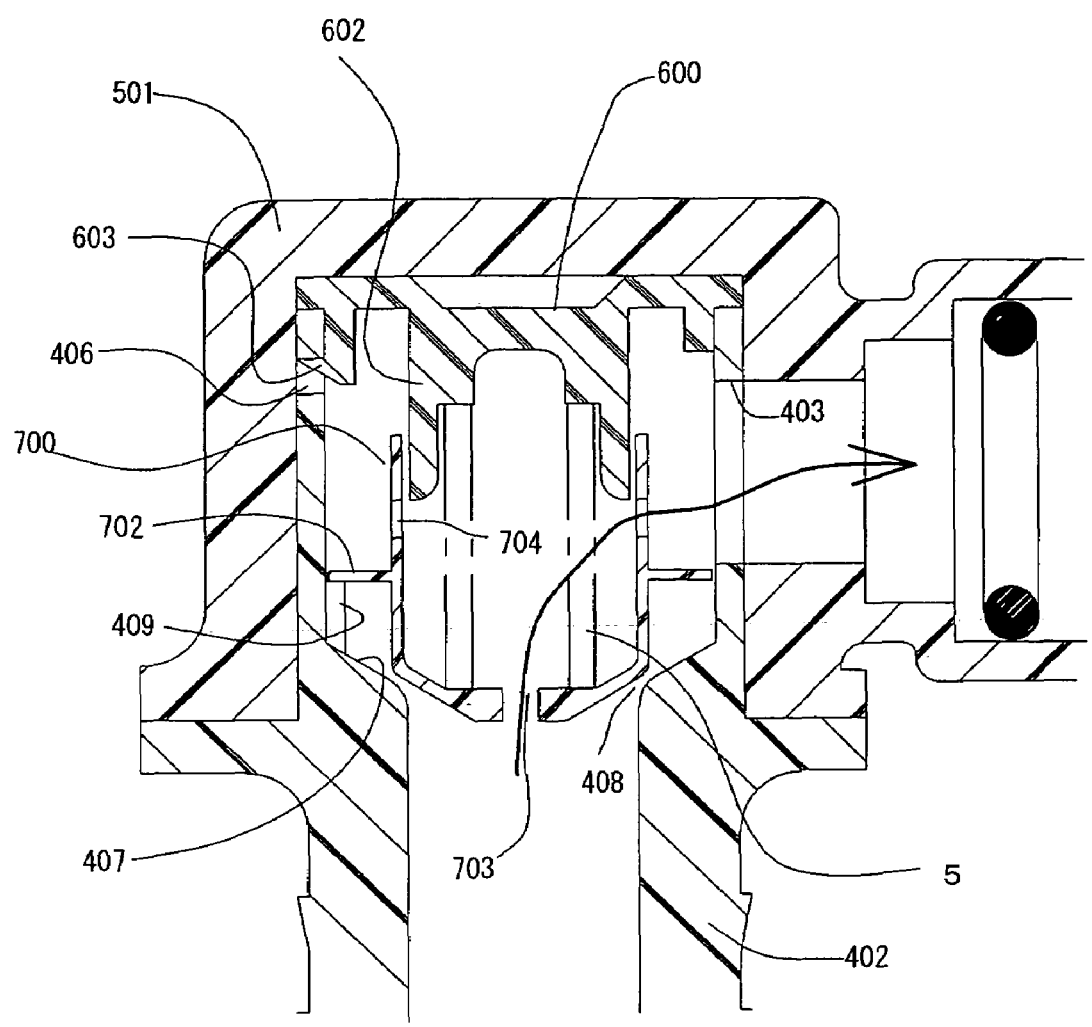
FIG. 26 is an enlarged cross-sectional view for illustrating a major part of a flow control valve according to Example No. 9 of the present invention.

Hence, in a flow control valve according to Example No. 9 of the present invention, a rib 409, which protrudes radially inward, is formed on an inner peripheral surface of the pipe 404, as shown in FIG. 26. In this way, the flange 702 of the valve element 700 contacts with the rib 409, and accordingly the rib 409 inhibits the valve member 700 from moving any more. Thus, a space is formed between the valve element 700 and the shoulder 407. Therefore, the valve element 700 is inhibited from adhering onto the shoulder 407 so that the operational stability upgrades. Note that, instead of the rib 409, bosses can be formed on the bottom surface of the valve element 700, or on the surface of shoulder 407. Moreover, instead of bosses, grooves or grained patterns, which are formed on either one of the bottom surface of the valve element 700 or on the surface of shoulder 407, operate and effect advantages likewise.

INDUSTRIAL APPLICABILITY

The present flow control valve can be used for breather nipples in breather circuits. In addition to breather nipples, the present flow control valve can be utilized in connectors disposed in breather circuits, and in valves disposed between cut-off valves and canisters.

Having now fully described the present invention, it will be apparent to one of ordinary skill in the art that many changes and modifications can be made thereto without departing from the spirit or scope of the present invention as set forth herein including the appended claims.

What is claimed is:

1. A flow control valve, comprising:
a housing having an inlet opening through which a fluid flows thereinto, and an outlet opening through which the fluid, flowed in through the inlet opening, flows out to the outside;
a valve element disposed movably in the housing;
means for urging the valve element in a direction approaching the inlet opening;
a first valve formed between the valve element and the housing, and closing the communication between the inlet opening and the outlet opening gradually as the valve element moves in a direction getting away from the inlet opening;
a second valve formed between the valve element and the housing, and opening the communication between the inlet opening and the outlet opening as the valve element moves in a direction getting away from the inlet, wherein the first valve is opened and the second valve is closed when a differential pressure between a pressure of the fluid on an inlet-opening side and a pressure of the fluid on an outlet-opening side is a predetermined value or less; and
the second valve opens the communication between the inlet opening and the outlet opening instantaneously when the differential pressure is more than a predetermined value;
an inlet-side member comprising:
a substantially cylinder-shaped first connector;
a substantially cylinder-shaped pipe extending coaxially from the first connector, and having a peripheral wall in which the outlet opening is disposed; and
a cover engaging mechanically with and being integrated with the pipe, and closing the leading end of the pipe to make the housing, wherein the cover closes the leading end of the pipe in such a manner that the valve element and the urging means are accommodated in the pipe, thereby integrating the inlet-side member; and
an outlet-side member comprising:
a receptacle having a peripheral wall, and accommodating the pipe of the inlet-side member therein; and
a second connector opening in the peripheral wall of the receptacle, and having a central axis extending in a direction crossing a central axis of the receptacle, wherein
the pipe of the inlet-side member is fitted into the receptacle so as to communicate the outlet opening, disposed in the pipe, with the second connector; and
the inlet-side member is connected with the outlet-side member in an air-proof manner and is integrated therewith so as to cross a central axis of the first connector with the central axis of the second connector.

2. The flow control valve set forth in claim 1, wherein:
the valve element is formed as a bottomed cylinder substantially, the bottomed cylinder opening at one of opposite ends; the housing has a protrusion protruding toward the inlet opening; and
the first valve is formed between the valve element and the protrusion of the housing.

3. The flow control valve set forth in claim 2, wherein:
the valve element has a flange; and
the second valve is formed between the housing and the flange of the valve element.

4. The flow control valve set forth in claim 1, wherein:
the first connector is connected with a breather tube in an air-proof manner; and
the second connector is connected with a branched pipe in an air-proof manner, the branched pipe protruding from a peripheral wall of an inlet pipe.

5. A flow control valve, comprising:
a housing having an inlet opening through which a fluid flows thereinto, and an outlet opening through which the fluid, flowed in through the inlet opening, flows out to the outside;
a valve element disposed movably in the housing;
means for urging the valve element in a direction approaching the inlet opening;
a first valve formed between the valve element and the housing, and closing the communication between the inlet opening and the outlet opening gradually as the valve element moves in a direction getting away from the inlet opening; and
a second valve formed between the valve element and the housing, and opening the communication between the inlet opening and the outlet opening as the valve element moves in a direction getting away from the inlet, wherein the first valve is opened and the second valve is closed when a differential pressure between a pressure of the fluid on an inlet-opening side and a pressure of the fluid on an outlet-opening side is a predetermined value or less; and the second valve opens the communication between the inlet opening and the outlet opening instantaneously when the differential pressure is more than a predetermined value, wherein:

the valve element is formed as a bottomed cylinder substantially, the bottomed cylinder opening at one of opposite ends;

the housing has a protrusion protruding toward the inlet opening; and the first valve is formed between the valve element and the protrusion of the housing.

6. The flow control valve set forth in claim 5, wherein:
the valve element has a flange; and
the second valve is formed between the housing and the flange of the valve element.

7. The flow control valve set forth in claim 6, wherein:
the valve element has a peripheral opening disposed in a peripheral wall, and is fitted around the protrusion of the housing; and
the peripheral opening of the valve element and the protrusion form the first valve.

8. The flow control valve set forth in claim 6 further comprising means for inhibiting the valve element from inclining, the means disposed between the valve element and the housing.

9. The flow control valve set forth in claim 8, wherein the means for inhibiting the valve element from inclining comprises an interference flange protruding radially outward from an outer periphery of the valve element.

10. The flow control valve set forth in claim 8, wherein the means for inhibiting the valve element from inclining comprises an interference rib protruding radially inward from an inner periphery of the housing.

11. The flow control valve set forth in claim 5, wherein:
the housing has a seating surface on which the valve element seats when the first pressure of the fluid on an inlet-opening side is the first predetermined value or less; and
at least one of the housing and the valve element has a contact which contacts with the other one of the housing and the valve element, thereby forming a space between the valve element and the seating surface of the housing.

12. The flow control valve set forth in claim 5, wherein:
the housing is fixed on a top of a fuel tank in an air-proof manner;
the inlet opening communicates with a gaseous phase of the fuel tank; and
the outlet opening communicates with an inlet pipe adjacent to a fuel supply opening of the inlet pipe.

13. The flow control valve set forth in claim 12, wherein the housing has a cylinder-shaped portion formed at a bottom thereof, and communicating with the inlet opening.

14. The flow control valve set forth in claim 5, wherein:
the inlet opening of the housing has an inlet central axis;
the outlet opening of the housing has an outlet central axis; and
the inlet central axis and the outlet central axis cross with each other.

15. The flow control valve set forth in claim 14, wherein:
the first valve communicates with an inlet pipe; and
the second valve communicates with a branched pipe protruding from a peripheral wall of an inlet pipe.

* * * * *